(12) United States Patent
Rohera

(10) Patent No.: US 10,523,019 B2
(45) Date of Patent: Dec. 31, 2019

(54) HYBRID POWER PACK

(71) Applicant: Hemant Rohera, Pune (IN)

(72) Inventor: Hemant Rohera, Pune (IN)

( * ) Notice: Subject to any disclaimer, the term of this patent is extended or adjusted under 35 U.S.C. 154(b) by 67 days.

(21) Appl. No.: 15/741,621

(22) PCT Filed: Aug. 11, 2015

(86) PCT No.: PCT/IB2015/056108
§ 371 (c)(1),
(2) Date: Jan. 3, 2018

(87) PCT Pub. No.: WO2017/009692
PCT Pub. Date: Jan. 19, 2017

(65) Prior Publication Data
US 2018/0198290 A1    Jul. 12, 2018

(30) Foreign Application Priority Data

Jul. 10, 2015 (IN) .......................... 2626/MUM/2015

(51) Int. Cl.
| | |
|---|---|
| *H02J 7/00* | (2006.01) |
| *H01M 10/42* | (2006.01) |
| *H01M 16/00* | (2006.01) |
| *H02J 1/10* | (2006.01) |
| *H02J 7/34* | (2006.01) |
| *H01M 10/46* | (2006.01) |

(52) U.S. Cl.
CPC ......... *H02J 7/0014* (2013.01); *H01M 10/425* (2013.01); *H01M 10/46* (2013.01); *H01M 16/003* (2013.01); *H02J 1/108* (2013.01); *H02J 7/0072* (2013.01); *H02J 7/345* (2013.01); *H01M 2010/4271* (2013.01)

(58) Field of Classification Search
CPC ............... H02J 7/0031; H02J 2007/004; H02J 2007/0037; Y02E 60/12; H01M 10/48

USPC ........................................................ 320/134
See application file for complete search history.

(56) References Cited

U.S. PATENT DOCUMENTS

| | | | |
|---|---|---|---|
| 7,207,405 B2 | 4/2007 | Reid et al. | |
| 8,896,315 B1 | 11/2014 | Davies | |
| 2002/0000785 A1* | 1/2002 | Ganz | B60H 1/00428 320/101 |
| 2003/0169022 A1* | 9/2003 | Turner | G06F 1/30 320/166 |
| 2004/0113586 A1* | 6/2004 | Chen | H02J 7/0019 320/118 |
| 2007/0210761 A1* | 9/2007 | Ohasi | H02J 7/0019 320/166 |
| 2012/0176085 A1* | 7/2012 | Iida | H02J 7/025 320/108 |
| 2013/0314023 A1* | 11/2013 | Collier | B60R 16/0307 320/101 |

OTHER PUBLICATIONS

International Search Report in corresponding International Application No. PCT/IB2015/056108 dated May 26, 2016.

* cited by examiner

*Primary Examiner* — Arun C Williams
(74) *Attorney, Agent, or Firm* — Andrus Intellectual Property Law, LLP

(57) ABSTRACT

The present disclosure relates to a hybrid power pack. The hybrid power pack includes a first storage component, a second storage component, a battery management system, a cell balancing circuit, a capacitor balancing circuit, a bidirectional switch, a unipolar transistor, an inout port, a first unidirectional switch and a second unidirectional switch. The hybrid power pack can provide sustained DC power to a load, drawing power selectively from the first storage component, the second storage component or from both storage components simultaneously.

20 Claims, 22 Drawing Sheets

HYBRID POWER PACK

CROSS-REFERENCE TO RELATED APPLICATIONS

This application is the U.S. national stage application of International Application PCT/IB2015/056108, filed Aug. 11, 2015, which international application was published on Jan. 19, 2017, as International Publication WO2017/009692 in the English language. The international application is incorporated herein by reference, in entirety. The international application claims priority to Indian Patent Application No. 2626/MUM/2015, filed Jul. 10, 2015, which is incorporated herein by reference, in entirety.

TECHNICAL FIELD

The present disclosure relates to hybrid power packs.

DEFINITIONS OF TERMS USED IN THE COMPLETE SPECIFICATION

The expression 'Hybrid power pack' used hereinafter in the specification refers to but is not limited to a pack which includes cells, capacitors, a controller, electronic components and electronic circuits.

The expression 'storage component' used hereinafter in the specification refers to but is not limited to a charge storage component such as battery cells, capacitors.

The expression 'Ultracapacitor' used hereinafter in the specification refers to but is not limited to a high-capacity electrochemical capacitor with capacitance values greater than 1,000 Farads.

The expression 'Discharge current' used hereinafter in the specification refers to but is not limited to a current supplied by a storage component to a load in a circuit.

The expression 'Inout' used hereinafter in the specification refers to but is not limited to a bidirectional port.

The expression 'discharging path' used hereinafter in the specification refers to but is not limited to a path through which a current flows from a storage component to a load, or other component.

The expression 'charging path' used hereinafter in the specification refers to but is not limited to a path through which a current flows from an input source to a storage component.

The expression 'SOC' (State of Charge) used hereinafter in the specification refers to but is not limited to the percentage of the maximum possible charge/energy that is present inside a storage component.

The expression 'SOH' (State of Health') used hereinafter in the specification refers to but is not limited to a 'measurement' that reflects the general condition of a storage component and its ability to deliver a specified performance compared to a fresh storage component.

The expression 'EOC' (End of Charge') used hereinafter in the specification refers to but is not limited to a minimum charge/energy that is present inside a storage component. (generally 10 percentage of full rated capacity of a storage component)

BACKGROUND

Lead acidic cells are used in a wide range of applications such as in electric vehicles, vehicles, solar systems, inverters and uninterrupted power supplies. If curing of the lead acidic cell is not done properly during the manufacturing process of lead acidic cell then, the negative terminal of the cell starts shedding. Further, due to overcharging or undercharging of the lead acidic cell, the plate of the lead acidic cell also starts shedding. Conventionally, lead acidic cell use hazardous chemicals such as concentrated sulphuric acid and lead. The concentrated sulphuric acid generates fumes of sulphur dioxide that can be even fatal. Further, the lead used in the lead acidic cell can emit particles which may result in lead poisoning.

In the prior art packs sometimes, electronic circuits are used alongwith the cells. U.S. Pat. No. 8,384,360 discloses a hybrid battery pack which includes a converter, a controller, an ultracapacitor and a battery. The pack disclosed in the U.S. Pat. No. 8,384,360 is configured for use in a vehicle. As suggested in the U.S. Pat. No. 8,384,360, an ultracapacitor supplies current to crank a vehicle. The ultracapacitor required for cranking the vehicle has a capacitance greater than a 1000 Farads. Such an ultracapacitor required for cranking a vehicle is relatively expensive, prone to failure and also prone to a relatively high self discharge. The ultracapcitor suggested by the U.S. Pat. No. 8,384,360 for starting/cranking a vehicle does not provide sustained power. The power source suggested in the U.S. Pat. No. 8,384,360 is a conventional lead acidic battery or VRLA. These batteries suffer from the same drawbacks as pointed out for lead acidic cells.

Therefore, there is felt a need for a hybrid power pack which:

provides a high discharge current;

protects the environment from the fumes of sulphur dioxide and particles emitted by lead; provides sustained DC power;

is able to start/crank a vehicle without using a capacitor having a relatively high capacitance; and limits deep discharge.

OBJECTS

An object of the present disclosure is to provide sustained DC power.

Another object of the present disclosure is to provide a high discharge current.

Still another object of the present disclosure is to limit deep discharge of a plurality of cells and capacitors.

Yet another object of the present disclosure is to provide an environment friendly hybrid power pack which is inexpensive, relatively long lasting, safe and sturdy.

Other objects and advantages of the present disclosure will be more apparent from the following description when read in conjunction with accompanying figures, which are not intended to limit the scope of the present disclosure.

SUMMARY

This summary is provided to introduce concepts related to a hybrid power pack. This summary is neither intended to identify essential features of the present disclosure nor is it intended for use in determining or limiting the scope of the present disclosure.

An embodiment of a hybrid power pack of the present disclosure comprises: a first storage component generating a first DC output voltage and a first DC output current; a battery management system coupled to the first storage component via a first unidirectional switch to provide a charging path for the first storage component; an inout port connected to the battery management system; a second unidirectional switch coupling the inout port with the first storage component to provide a discharging path for the first storage component; a second storage component generating a second DC output voltage and a second DC output current, wherein the second storage component is coupled to the inout port via a bidirectional switch to provide a charging path as well as a discharging path for the second storage component; a controller cooperating with the battery management system, the bidirectional switch and the inout port to provide, to a load connected to the inout port, a sustained DC power selectively from the first storage component, the second storage component or from both storage components simultaneously.

A hybrid power pack of the present disclosure includes a plurality of cells as a first storage component, a capacitor bank as a second storage component, a battery management system, a cell balancing circuit, a capacitor balancing circuit, a bidirectional switch, a unipolar transistor, an inout port, a controller, a first unidirectional switch and a second unidirectional switch. The cell balancing circuit includes a cell control circuit and a cell balancing controller. The cell balancing circuit is used to equalize at least one of the charge, energy and voltage of the cells. The capacitor balancing circuit is used equalize at least one of the charge, energy and voltage of the capacitor bank. The bidirectional switch includes a charging/discharging circuit, a comparator, a zener diode regulator, a switching element and a monitor and control unit for capacitors.

In another embodiment of a hybrid power pack of the present disclosure, the hybrid power pack can include integration of a battery management system and a controller into a first application specific integrated circuit.

In another embodiment of a hybrid power pack of the present disclosure, the hybrid power pack can include integration of a battery management system, a controller, a cell balancing circuit and a capacitor balancing circuit into a second application specific integrated circuit.

In another embodiment of a hybrid power pack of the present disclosure, the hybrid power pack can include integration of a battery management system, a controller and a capacitor balancing circuit into a third application specific integrated circuit.

In another embodiment of a hybrid power pack of the present disclosure, the hybrid power pack can include integration of a battery management system, a controller and a cell balancing circuit into a fourth application specific integrated circuit.

In another embodiment of a hybrid power pack of the present disclosure, the hybrid power pack can include a coil wound ferrite core to generate a first AC signal, an amplifier to amplify the first AC signal and a rectifier to convert the first AC signal into a DC signal.

In another embodiment of a hybrid power pack of the present disclosure, the hybrid power pack can include a first AC to DC converter connectable to an AC power source for generating a sustained DC power.

In another embodiment of a hybrid power pack of the present disclosure, the hybrid power pack can include a step up DC to DC converter connectable to a DC power source such as a sloar cell, fuel cell for generating sustained DC power.

In another embodiment of a hybrid power pack of the present disclosure, the hybrid power pack can include an antenna configured to capture radio frequencies, an RF receiver module to generate a second AC signal from the captured frequencies, an RF amplifier to amplify the second AC signal and a second AC to DC converter to convert said second AC signal into a DC signal.

BRIEF DESCRIPTION OF THE ACCOMPANYING DRAWING

Embodiments of the hybrid power pack of the present disclosure are illustrated with reference to the accompanying figures, wherein FIG. 1 illustrates a housing for a hybrid power pack, according to an implementation of the present disclosure;

DETAILED DESCRIPTION

The present disclosure relates to a hybrid power pack for delivering a sustained power to a load.

Unless specifically stated otherwise as apparent from the following discussions, it is to be appreciated that throughout the present disclosure, discussions utilizing terms such as "receiving" or "determing" or "analyzing" or "extracting" or the like, refer to the action and processes of a controller that manipulates and transforms data represented as physical (electronic) quantities within the controller's registers and memories into other data similarly represented as physical quantities within the controller memories or registers.

The systems are not limited to the specific embodiments described herein. In addition, components of each system can be practiced independently and separately from other components described herein. Each component can be used in combination with other components.

The present disclosure envisages a hybrid power pack. The hybrid power pack includes a plurality of storage components, a plurality of power sources, a plurality of electronic components, a controller, a battery management system and cell balancing circuit.

Further, the present disclosure is directed towards integration of multiple components into a single application specific integrated circuit (ASIC).

Further, the present disclosure directed towards a hybrid power pack for delivering a sustained power to a load.

Further, the present disclosure directed towards a hybrid power pack which provides a smooth charging to storage components such as cells and capacitors.

These and other advantages of the present subject matter would be described in greater detail in conjunction with the following figures.

Figure 1:
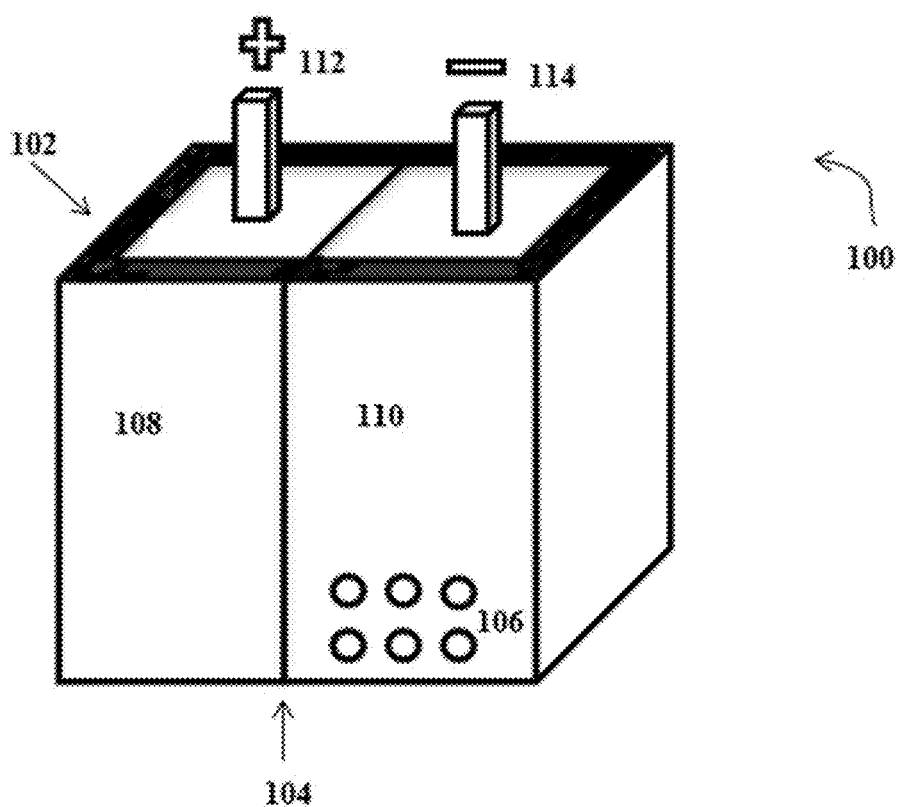

FIG. 1 illustrates a housing for a hybrid power pack (100), according to an implementation of the present disclosure. The housing for the hybrid power pack may be designed using PP (Polypropylene), ABS (Acrylonitrile butadiene styrene) or PPCP. The ABS is generally a low-hazard material and presents few risks to health. The housing is divided into two compartments using a separator (104). The separator (104) is designed using a plastic material. The first compartment is a controlling circuit compartment (108). The controlling circuit compartment (108) includes a controlling circuit (116). The second compartment is a storage compartment (110). The storage compartment (110) includes a plurality of storage components. The controlling circuit compartment (108) also includes a heat sink component. The heat sink component dissipates the heat from the controlling circuit compartment (108) to the exterior of the housing. The compartments are double walled. Each of the compartments are water tight and lined with heat insulation (102) to prevent external heat from affecting the working of the storage compartment and controlling circuit. Typically, lining material may be epoxy resin or any other plotting material. A coolant flowing pipes may be added to the storage compartment. Further, the compartments are double walled. The controlling circuit compartment (108) includes a plurality of holes (106) for ventilation. The hybrid power pack (100) includes a positive terminal (112) and a negative terminal (114). The positive terminal (112) is connected to a positive terminal of the controlling circuit and the negative terminal (114) is connected to a negative terminal of the controlling circuit. Further, the storage components are connected to the controlling circuit. The storage component includes a plurality of cells. The storage component also includes a bank of capacitors. The controlling circuit broadly includes a battery management system (BMS), a cell balancing circuit, a first unidirectional switch, a second unidirectional switch, a capacitor balancing circuit, an inout port, a ground terminal, a controller, a bidirectional switch and a unipolar transistor.

Figure 2:
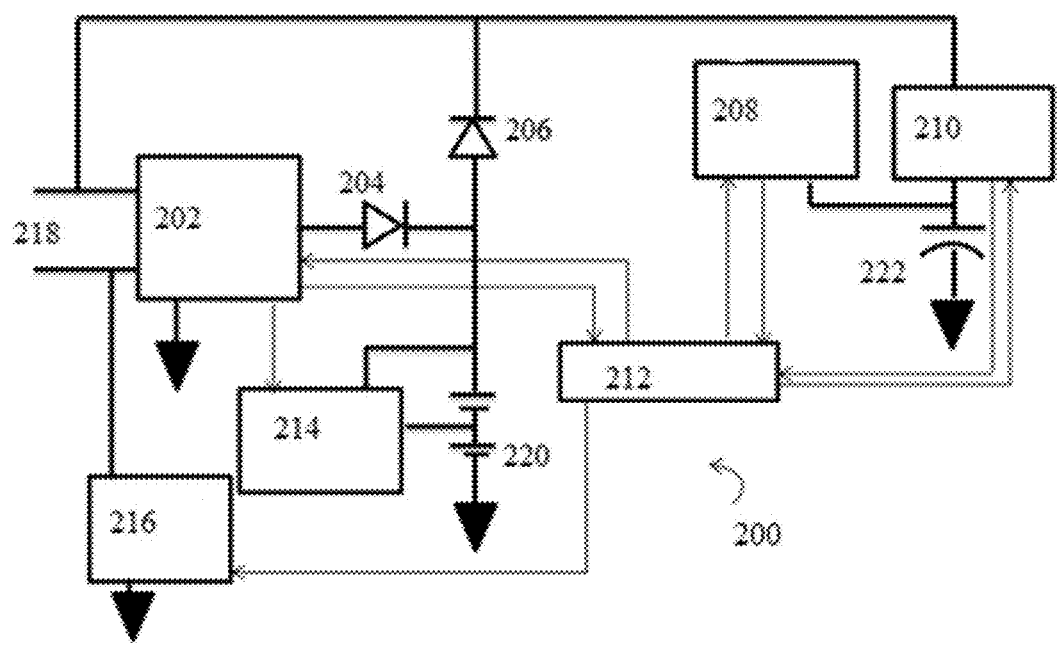
FIG. 2 illustrates a block diagram for a hybrid power pack in accordance with first embodiment of the present disclosure.

FIG. 2 illustrates a block diagram for a hybrid power pack (200) in accordance with first embodiment of the present disclosure. The hybrid power pack (200) includes a plurality of cells (220) as a first storage component, a capacitor bank (222) as a second storage component, a battery management system (202), a cell balancing circuit (214), a capacitor balancing circuit (208), a bidirectional switch (210), a unipolar transistor (216), an inout port (218), a controller (212), a first unidirectional switch (204) and a second unidirectional switch (206). The battery management system (202) comprises an input port and an output port. The input port of the battery management system is connected to the inout port (218). The output port of the battery management system (202) is connected to an anode terminal of first unidirectional switch (204). A cathode terminal of the first unidirectional switch(204) is connected to a positive terminal of plurality of cells (220). The positive terminal of the cells (220) is connected to an anode terminal of the second unidirectional switch (206). A cathode terminal of the second unidirectional switch (206) is connected to the inout port (218). The capacitor bank (222) is connected to the bidirectional switch (210), and the bidirectional switch (210) is connected to the inout port (218). A drain terminal of the unipolar transistor (216) is connected to the inout port (218). A source terminal of the unipolar transistor (216) is connected to a ground terminal. The controller (212) is cooperating with the cell balancing circuit (214), the capacitor balancing circuit (208), the battery management system (202), the bidirectional switch (210) and a gate terminal of the unipolar transistor (216).

In the first embodiment of the present disclosure, a charging current for cells (220) flows from an inout port (218) to a battery management system (202) and further, from the battery management system (202) to a positive terminal of the cells via a first unidirectional switch (204).

In the first embodiment of the present disclosure, a discharging current of cells (220) flows from a positive terminal of the cells to an inout port (218) via a second unidirectional switch (206).

In the first embodiment of the present disclosure, a charging current for a capacitor bank (222) flows from an inout port (218) to a bidirectional switch (210) and further, from the bidirectional switch (210) to the capacitor bank (222).

In the first embodiment of the present disclosure, a discharging current of a capacitor bank (222) flows from a capacitor bank (222) to a bidirectional switch (210) and further, from the bidirectional switch (210) to an inout port (218).

In accordance with the present disclosure, a controller (212) reads a state of charge (SOC) of cells (220) from a battery management system (202). Further, the controller (212) reads a state of charge (SOC) of a capacitor bank (222) from a bidirectional switch(210). The controller (212) executes a state of charge algorithm based on the SOC of cells and SOC of the capacitor bank to determine an end of charge (EOC) of cells and EOC of the capacitor bank (222). Further, the controller (212) is scheduled to read an updated SOC of cells from the battery management system (202) and an updated SOC of the capacitor bank (222) from the bidirectional switch (210) after a predetrmined time interval. The predetermined time interval is determined based on the SOC of cells and SOC of the capacitor bank. The controller (212) activates a gate terminal of a unipolar transistor (216) to disconnect cells (220) and the capacitor bank (222) from the ground terminal if the updated SOC of cells is equal to the determined EOC of cells and the updated SOC of the capacitor bank is equal to the determined EOC of the capacitor bank. Thus, by disconnecting the cells from the ground terminal, the controller (212) and the unipolar transistor provides a deep discharge control and isolation for cells and the capacitor bank. Further, the controller (212) is configured to select cells (220), the capacitor bank (222) or both of them simultaneously to deliver a power to a load. The load is connected to the inout port (218). The controller (212) executes a source selection algorithm to select the cells (220), the capacitor bank (222) or both of them simultaneously based on the SOC (state of charge) of the cells and the SOC (state of charge) of the capacitor bank.

In accordance with the present disclosure, a first storage component includes a plurality of cells (220). The plurality of cells (220) may include a flow cell, a vanadium redox cell, a zinc bromide cell, a fuel cell, a lead acidic cell, a VRLA cell, a lithium ion cell, a AGM cell, a gel cell, a lithium ion polymer cell, a molten salt cell, a nickel cadmium cell, a sodium ion cell, a super iron cell, a silver zinc cell, a zinc chloride cell, a graphene cell, a sodium metal halide cell, a silicon cell, a hybrid cell, zinc carbon cell and all other cells. The cells are connected in series configuration for high voltage applications and the cells are connected in parallel configuration for high current applications. Typically, for a vehicular application which needs 12 V, the three cells are connected in series configuration.

In accordance with the present disclosure, a second storage component includes a capacitor bank (222). The capacitor bank (222) includes a plurality of capacitors. The capacitors may include a ceramic capacitor, a film capacitor, a paper capacitor, an aluminum electrolytic capacitor, a tantalum electrolytic capacitor, a supercapacitor, a mica capacitor, a glass capacitor, a ultra capacitor, a vacuum capacitor, a hybrid capacitor, a silicon capacitor, a lithium capacitor, a graphene capacitor and all other capacitors. The capacitors are connected in series configuration for high voltage applications.

In accordance with the present disclosure, a unipolar transistor (216) may be a MOSFET or a FET or a JFET or an IGBT or an UJT or a NMOS transistor or a PMOS transistor or a CMOS transistor. In one embodiment, the unipolar transistor (216) is a MOSFET. A gate terminal of the MOSFET is controlled by a controller (212). A drain terminal of the MOSFET is connected to an inout port (218). A source terminal of the MOSFET is connected to the ground terminal. Further, the MOSFET disconnects the ground terminal connection of a hybrid power pack (100) based on an activation signal received from the controller (212). If, value of the activation signal is 0 Volt, then the hybrid power pack (100) is disconnected from the ground terminal and if, value of the activation signal is 5 Volt, then the hybrid power pack (100) is connected to the ground terminal.

In accordance with the present disclosure, an inout port (218) is controlled by a battery management system (202). The battery management system (202) receives a mode selection signal from a controller (212). The controller (212) executes a mode selection algorithm to decide an input mode or an output mode and generates the mode selection signal. The inout port (218) may be one port or two port or multi port.

In accordance with the present disclosure, a cell balancing circuit (214) is connected to cells. The cell balancing circuit is cooperating with a battery management system (202). The cell balancing circuit (214) equalizes at least one of the charge, energy or voltage of cells.

In accordance with the present disclosure, a capacitor balancing circuit (208) is connected to a capacitor bank (222). The capacitor bank (222) includes a plurality of capacitors. The capacitor balancing circuit (208) is cooperating with a controller (212). The capacitor balancing circuit (208) equalizes at least one of the charge, energy or voltage of capacitors.

In accordance with the present disclosure, a first unidirectional switch (204) may be a diode, a MOSFET acting as a diode or a BJT acting as a diode or a SCR acting as a diode or any other unidirectional switching device.

In accordance with the present disclosure, a second unidirectional switch (206) may be a diode, a MOSFET acting as a diode or a BJT acting as a diode or a SCR acting as a diode or any other unidirectional switching device. The second unidirectional switch provides a path for high discharge current.

Figure 3:
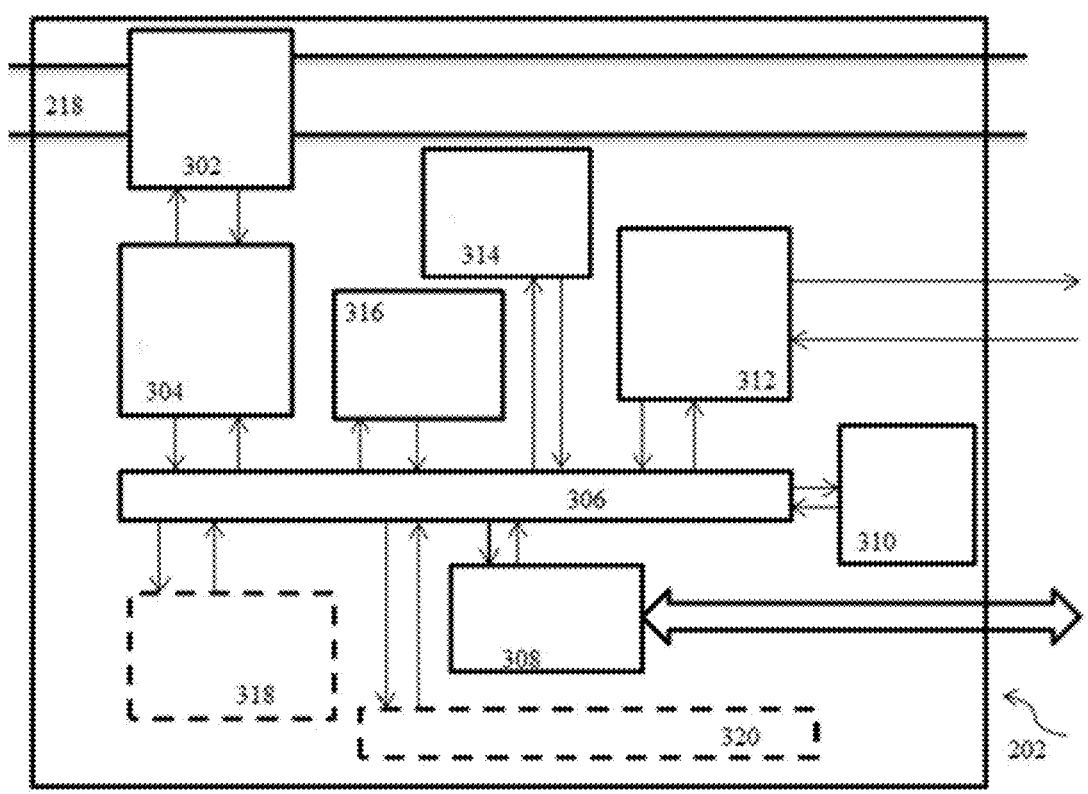
FIG. 3 illustrates a block diagram of a battery management system in accordance with one embodiment of the present disclosure, for the hybrid power pack of FIG. 2.

FIG. 3 illustrates a block diagram of a battery management system (202) in accordance with one embodiment of the present disclosure, for the hybrid power pack (200) of FIG. 2. The battery management system (202) includes a power module (PM) (302), a monitor and control unit for PM (304), a monitor and control unit for cells (312), a BMS controller (306), a plurality of communication ports (308), a battery status display module (318), a non-transient repository (316), a transient repository (314) and an on board diagnostics module (320). The power module (302) includes a step down DC to DC converter (400) and a charger circuit. The charger circuit provides smooth charging of cells. The monitor and control unit for PM (304) monitors currents and voltages at various points in the PM (302). Further, the monitor and control unit of PM (304) controls a step down DC to DC converter (400) and the charger circuit based on command signals received from a BMS controller (306). The output of the PM (302) is directly connected to cells (220) via a first unidirectional switch (204). The monitor and control unit for cells (312) measures various variables associated with cells such as voltage, current, state of charge (SOC), top of charge (TOC), state of health (SOH) and temperature. Further, the monitor and control unit for cells (312) communicates the measured variables to the BMS controller (306). The communication ports (308) are used to download an external program into the battery management system (202) through an external computer. Further, the communication ports (308) are used to communicate with an outside electronic environment. The battery status display (318) may include a single Light-Emitting Diode (LED) that indicates cells low voltage status. The battery status display (318) may include a string of LEDs indicating SOC of cells or a Liquid Crystal Display (LCD) that indicates cells status, including SOC and cell condition. The on board diagnostics (320) includes a diagnostic trouble codes for testing the battery management system (202). The BMS controller (306) performs following functions: controlling voltage and current profile of the PM (302) during charging process; providing top up charge to individual cells to equalize the charge on cells; isolating cells during fault or alarm conditions; providing short circuit protection; providing reverse polarity protection; cooperating with a controller (212), controlling the monitor and control unit for PM (304), the monitor and control unit for cells (312), the battery status display (318), the communication ports (308) and the on board diagnostics (320).

Figure 4:
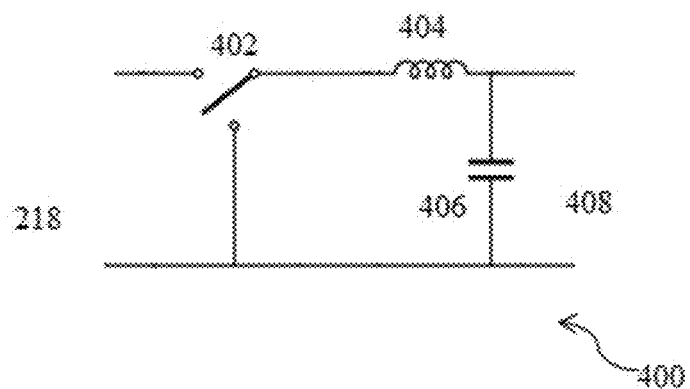
FIG. 4 illustrates a circuit diagram of a step down DC to DC converter in accordance with one embodiment of the present disclosure, for the hybrid power pack of FIG. 2.

FIG. 4 illustrates a circuit diagram of a step down DC to DC converter (400) in accordance with one embodiment of the present disclosure, for the hybrid power pack (200) of FIG. 2. The DC to DC converter is present in a battery management system (202). The step down DC to DC converter (400) includes a switching network (402), an inductor (404) and a capacitor (406). An input port of the step down DC to DC converter (400) is connected to an inout port (218) of a hybrid power pack (100). An output port (408) of the step down DC to DC converter (400) is connected to an input port of a charger circuit. The switching network (402) may include BJT transistor, MOS transistor, SCR, IGBT or any other semiconductor switching device. The switching network (402) is controlled by a monitor and control unit for PM (304). When the switching network (402) is in off-state, current in the step down DC to DC converter (400) is zero. When the switching network (402) is in on-state, current starts to flow, and an inductor (404) produces an opposing voltage across its terminals. A voltage drop across the inductor (404) counteracts an input voltage of the input port of the step down DC to DC converter (400) and therefore reduces the net voltage across the output terminal (408) of the step down DC to DC converter (400).

Figure 5:
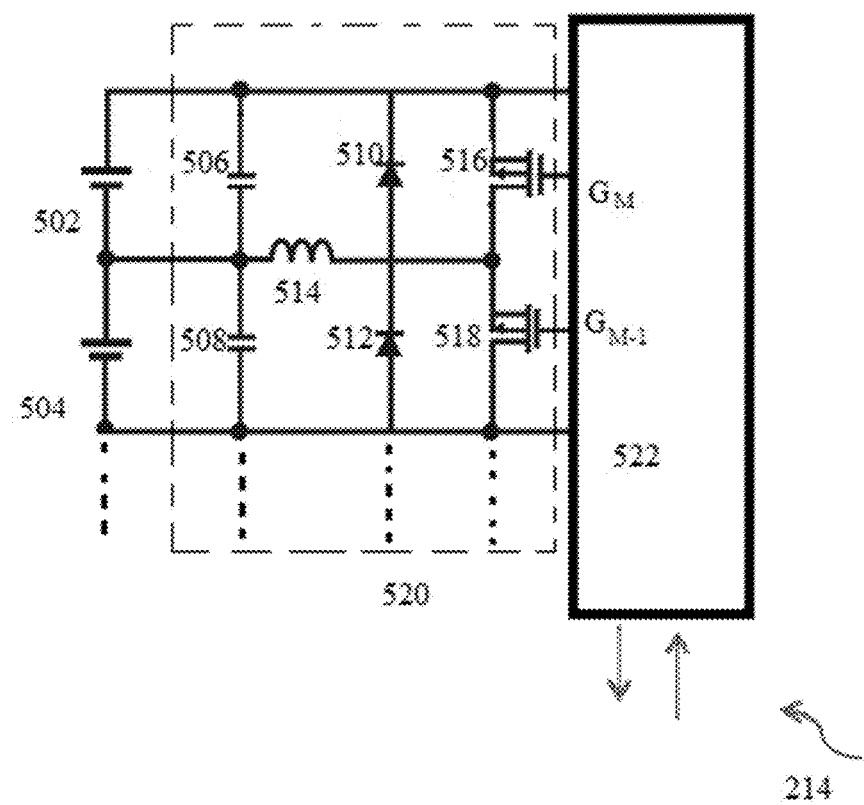
FIG. 5 illustrates a circuit diagram of a cell balancing circuit in accordance with one embodiment of the present disclosure, for the hybrid power pack of FIG. 2.

FIG. 5 illustrates a circuit diagram of a cell balancing circuit (214) in accordance with one embodiment of the present disclosure, for the hybrid power pack (200) of FIG. 2. The cell balancing is a technique of compensating weaker cells by equalizing charge (voltage or energy) on cells to extend the overall life of cells. Typically, FIG. 5 shows a cell balancing circuit with M cells. The value of M may be any integer value. The cell balancing circuit (214) includes a cell control circuit (520) and a cell balancing controller (522). The cell control circuit (520) includes a plurality of MOSFETs, a plurality of diodes, a plurality of capacitors and a plurality of inductors. Typically, as shown in FIG. 5, a $Cell_M$ (502) is connected in parallel with a capacitor $C_M$ (506), the capacitor $C_M$ (506) is in parallel connection with a series combination of a diode $D_M$ (510) and an inductor $L_M$ (514), the diode $D_M$ (510) is in parallel combination with a MOSFET$_M$ (516). Further, a $Cell_{M-1}$ (504) is in series combination with the $Cell_M$ (502), a capacitor $C_M$ (508) is in series combination with the capacitor $C_M$ (506), a diode $D_{M-1}$ (512) is in series combination with the diode $D_M$ (510), a MOSFET$_{M-1}$ (518) is in series combination with the MOSFET$_M$ (516). Further, same arrangement is repeated for remaining cells. The gate of the MOSFET$_M$ (516) and MOSFET$_{M-1}$ (518) is controlled by the cell balancing controller (522). The cell balancing controller (522) monitors voltages of cells. The cell balancing controller (522) executes a cell balancing control algorithm. If the cell balancing control algorithm determines that the $Cell_M$ (502) needs to transfer its energy to the $Cell_{M-1}$ (504), then the cell balancing controller (522) activates the MOSFET$_M$ (516). A voltage of the $Cell_M$ (502) is applied to the inductor $L_M$ (514) and the inductor current linearly increases. A cell charge is transferred from the $Cell_M$ (502) to the inductor $L_M$ (514). When the MOSFET$_M$ (516) is deactivated by the cell balancing controller (522), an energy stored in the inductor $L_M$ (514) reaches a maximum value. The diode $D_{M-1}$ (512) is forward biased and a negative cell voltage of $Cell_{M-1}$ (504) is applied to the inductor $L_M$ (514), which results in a decrease in the inductor current and transfers the energy stored in the inductor $L_M$ (514) to the $Cell_{M-1}$ (504).

Figure 6:
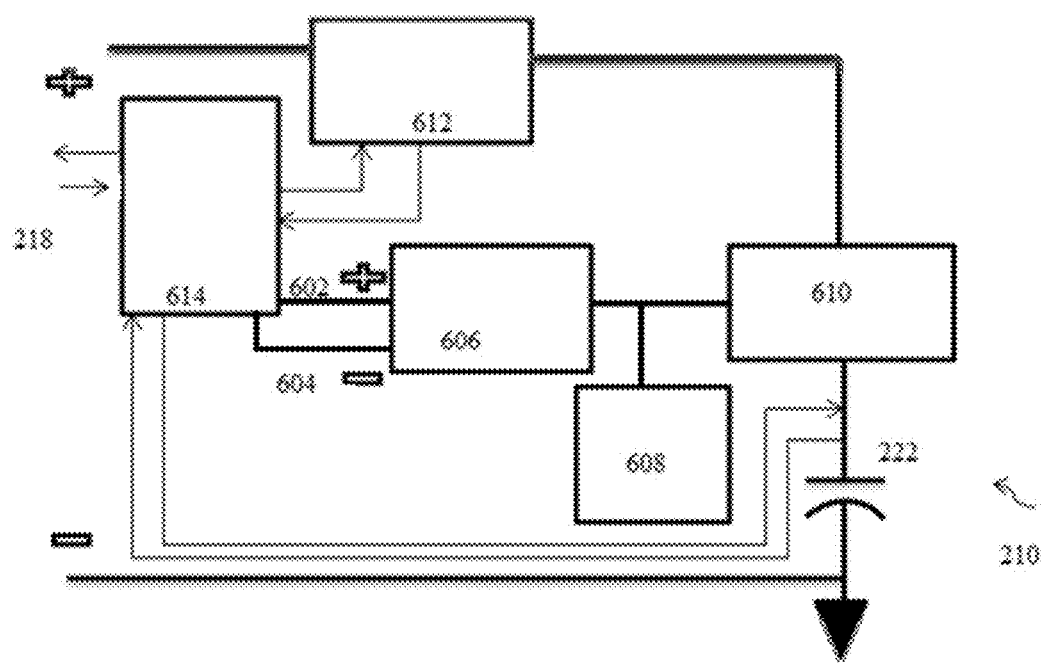
FIG. 6 illustrates a block diagram of a bidirectional switch in accordance with one embodiment of the present disclosure, for the hybrid power pack of FIG. 2.

FIG. 6 illustrates a block diagram of a bidirectional switch (210) in accordance with one embodiment of the present disclosure, for the hybrid power pack (100) of FIG. 2. The bidirectional switch (210) includes a comparator (606), a zener diode regulator (608), a switching element (610), a charging/discharging circuit (612) and a monitor and control unit for capacitors (614). The monitor and control unit for capacitors (614) measures various variables associated with capacitors such as voltage, current, state of charge (SOC), top of charge (TOC), state of health (SOH) and temperature. The monitor and control unit for capacitors (614) is connected with a controller (212) and generates a signal (602) indicating instantaneous voltage level of the capacitors. Further, the monitor and control unit for capacitors (614) also receives a threshold voltage level for capacitors from a controller (212) and generates a signal (604) indicating the threshold voltage level for capacitors. The comparator (606) compares the signal (602) indicating instantaneous voltage level of the capacitors with the signal (604) indicating the threshold voltage level for capacitors (604). The comparator (606) may be an operational amplifier IC (for example IC 741 from Texas Instruments) in open loop configuration. An output voltage of the comparator (606) is regulated by a zener diode regulator (608) to generate a regulated output voltage. The regulated output voltage has two voltage levels (0V and 5V). The regulated output voltage controls switching of the switching element (610) as a closed switch to connect a single inout port (218) with the capacitors (222) or an open switch to disconnect the single inout port (218) from the capacitors (222). The switching element may be a digital IC (for example IC 7432 from Texas Instruments) or a relay or a MOS transistor or a bipolar transistor or any other switching semiconductor device.

Figure 7:
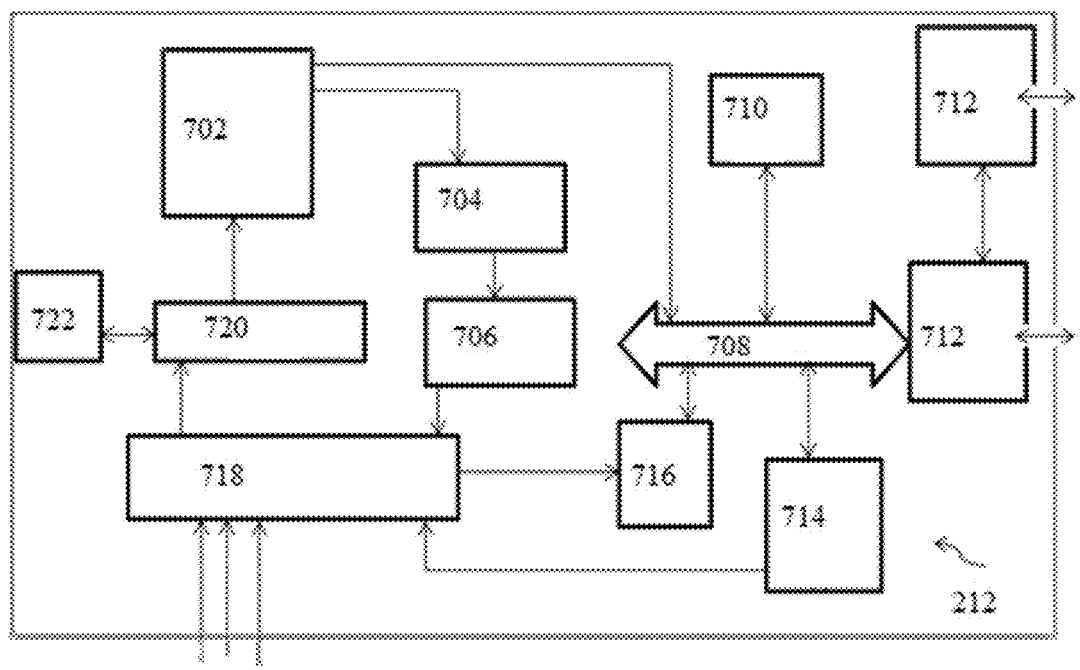
FIG. 7 illustrates a block diagram of a controller in accordance with one embodiment of the present disclosure, for the hybrid power pack of FIG. 2.

FIG. 7 illustrates a block diagram of a controller (212) in accordance with one embodiment of the present disclosure, for the hybrid power pack (200) of FIG. 2. The controller (212) includes a program execution section and a register processing section. The program execution section includes a program memory (702), an instruction register (704), an instruction decoder (706), a timing and control and register selection module (718), a program counter (720), a stack (722). The register processing section includes a special function registers (714), a port rgisters (712), a data register (710), an arithmetic and logic unit (ALU) (716) and a data bus (708). Further, the controller (212) also includes an address bus, an address decoding logic and a plurality of control signals. The address bus is coupled to the timing and control and register selection module (718). The address decoding logic is present inside the timing and control and register selection module (718). The control signals are coupled to the timing and control and register selection module (718). The controller (212) may be a PIC microcontroller or an ARM processor or a dual core processor or a FPGA (field programmable gate array) or an AVR microcontroller.

Figure 8:
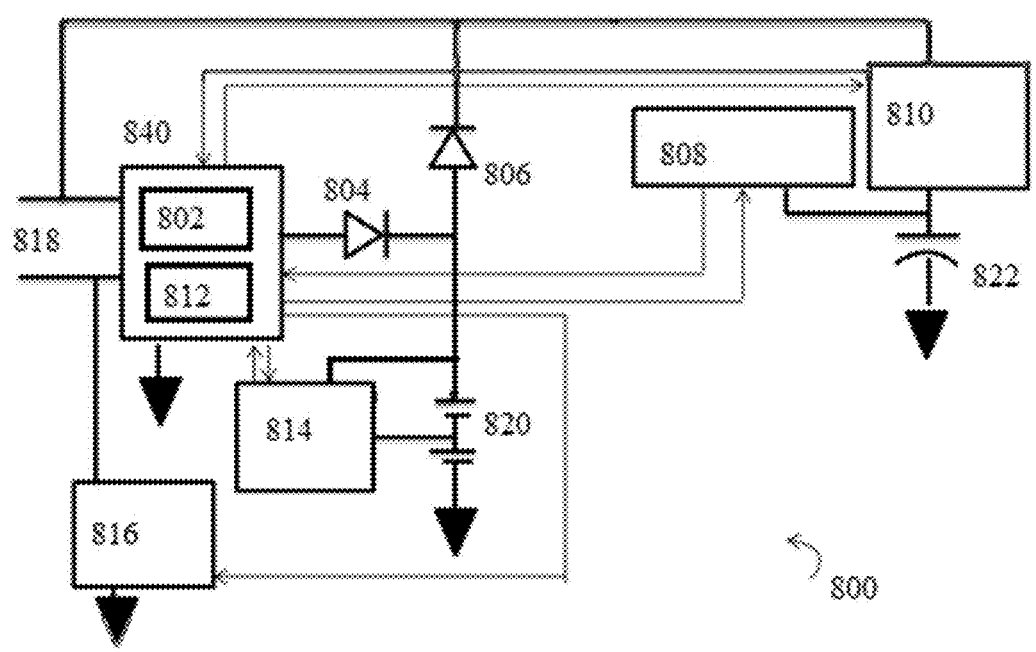
FIG. 8 illustrates a block diagram for a hybrid power pack in accordance with second embodiment of the present disclosure.

FIG. 8 illustrates a block diagram for a hybrid power pack (800) in accordance with second embodiment of the present disclosure. The hybrid power pack (800) includes a battery management system (802) and a controller (812) integrated into one block as a first application specific integrated circuit (840), a plurality of cells (820) as a first storage component, a capacitor bank (822) as a second storage component, a cell balancing circuit (814), a capacitor balancing circuit (808), a bidirectional switch (810), an inout port (818), a unipolar transistor (816), a first unidirectional switch (804) and a second unidirectional switch (806), according to the second embodiment of the present disclosure. Further, the first application specific integrated circuit (840) comprises an input port and an output port. The input port of the first application specific integrated circuit (840) is connected to the inout port (818). The output port of first application specific integrated circuit (840) is connected to an anode terminal of first unidirectional switch (804). A cathode terminal of the first unidirectional switch (804) is connected to a positive terminal of plurality of cells (820). The positive terminal of the cells (820) is connected to an anode terminal of the second unidirectional switch (806). A cathode terminal of the second unidirectional switch (806) is connected to the inout port (818). The capacitor bank (822) is connected to the bidirectional switch (810), and the bidirectional switch (810) is connected to the inout port (818). A drain terminal of the unipolar transistor (816) is connected to the inout port (818). A source terminal of the unipolar transistor (816) is connected to a ground terminal. The first application specific integrated circuit (802) is cooperating with the cell balancing circuit (814), the capacitor balancing circuit (808), the bidirectional switch (810) and a gate terminal of the unipolar transistor (816). The first application specific integrated circuit (840) is configured to select the cells (820), the capacitor bank (822) or both of them simultaneously to deliver a power to a load. The load is connected to the inout port (818).

In the second embodiment of the present disclosure, a charging current for cells (820) flows from an inout port (818) to a first application specific integrated circuit (840) and further, from a first application specific integrated circuit (840) to a positive terminal of the cells via a first unidirectional switch (804).

In the second embodiment of the present disclosure, a discharging current of cells (820) flows from a positive terminal of the cells to an inout port (818) via a second unidirectional switch (806).

In the second embodiment of the present disclosure, a charging current for a capacitor bank (822) flows from an inout port (818) to a bidirectional switch (810) and further, from the bidirectional switch (810) to the capacitor bank (822).

In the second embodiment of the present disclosure, a discharging current of a capacitor bank (822) flows from the capacitor bank (822) to a bidirectional switch (810) and further, from the bidirectional switch (810) to an inout port (818).

Figure 9:
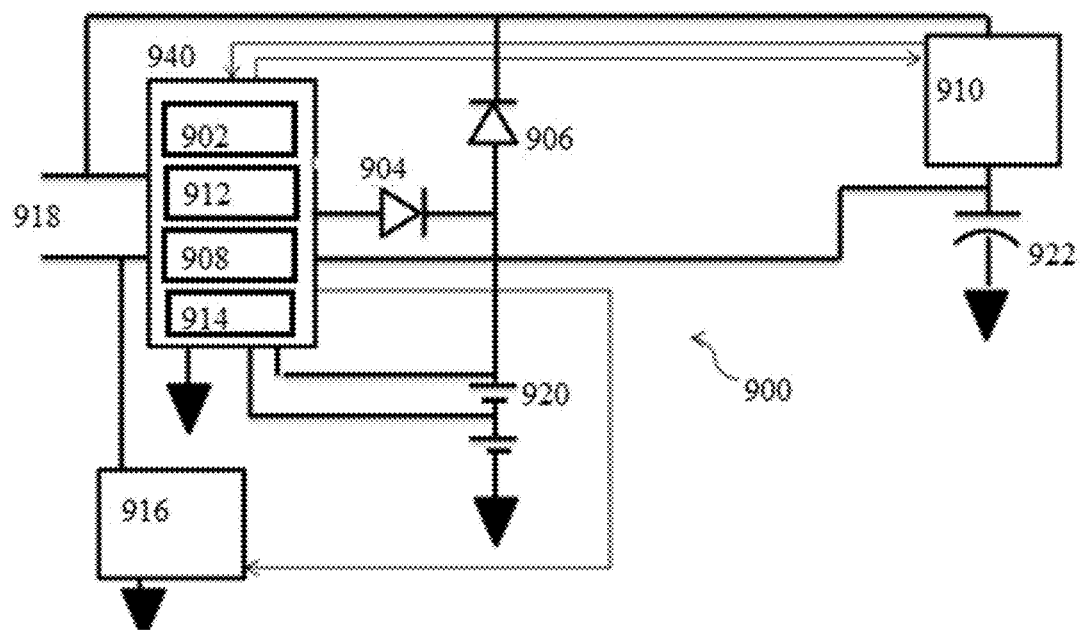
FIG. 9 illustrates a block diagram for a hybrid power pack in accordance with third embodiment of the present disclosure.

FIG. 9 illustrates a block diagram for a hybrid power pack (900) in accordance with third embodiment of the present disclosure. The hybrid power pack (900) includes a battery management system (902), a controller (912), a capacitor balancing circuit (908) and a cell balancing circuit (914) integrated into one block as a second application specific integrated circuit (940), a plurality of cells (920) as a first storage component, a capacitor bank (922) as a second storage component, a bidirectional switch (910), an inout port (918), a unipolar transistor (916), a first unidirectional switch (904) and a second unidirectional switch (906), according to the third embodiment of the present disclosure. Further, the second application specific integrated circuit (902) comprises an input port and an output port. The input port of the second application specific integrated circuit (902) is connected to the inout port (918). The output port of second application specific integrated circuit (902) is connected to an anode terminal of first unidirectional switch (904). A cathode terminal of the first unidirectional switch (904) is connected to a positive terminal of plurality of cells (920). The positive terminal of the cells (920) is connected to an anode terminal of the second unidirectional switch (906). A cathode terminal of the second unidirectional switch (906) is connected to the inout port (918). The capacitor bank (922) is connected to the bidirectional switch (910), and the bidirectional switch (910) is connected to the inout port (918). A drain terminal of the unipolar transistor (916) is connected to the inout port (918). A source terminal of the unipolar transistor (916) is connected to a ground terminal. The second application specific integrated circuit (902) is cooperating with the bidirectional switch (910) and a gate terminal of the unipolar transistor (916). The second application specific integrated circuit (940) is configured to select the cells (920), the capacitor bank (922) or both of them simultaneously to deliver a power to a load. The load is connected to the inout port (918).

In the third embodiment of the present disclosure, a charging current for cells (920) flows from an inout port (918) to a second application specific integrated circuit (940) and further, from the second application specific integrated circuit (940) to a positive terminal of the cells via a first unidirectional switch (904).

In the third embodiment of the present disclosure, a discharging current of cells (920) flows from a positive terminal of the cells to an inout port (918) via a second unidirectional switch (906).

In the third embodiment of the present disclosure, a charging current for a capacitor bank (922) flows from an inout port (918) to a bidirectional switch (910) and further, from the bidirectional switch (910) to the capacitor bank (922).

In the third embodiment of the present disclosure, a discharging current of a capacitor bank (922) flows from the capacitor bank (922) to a bidirectional switch (910) and further, from the bidirectional switch (910) to an inout port (218).

Figure 10:
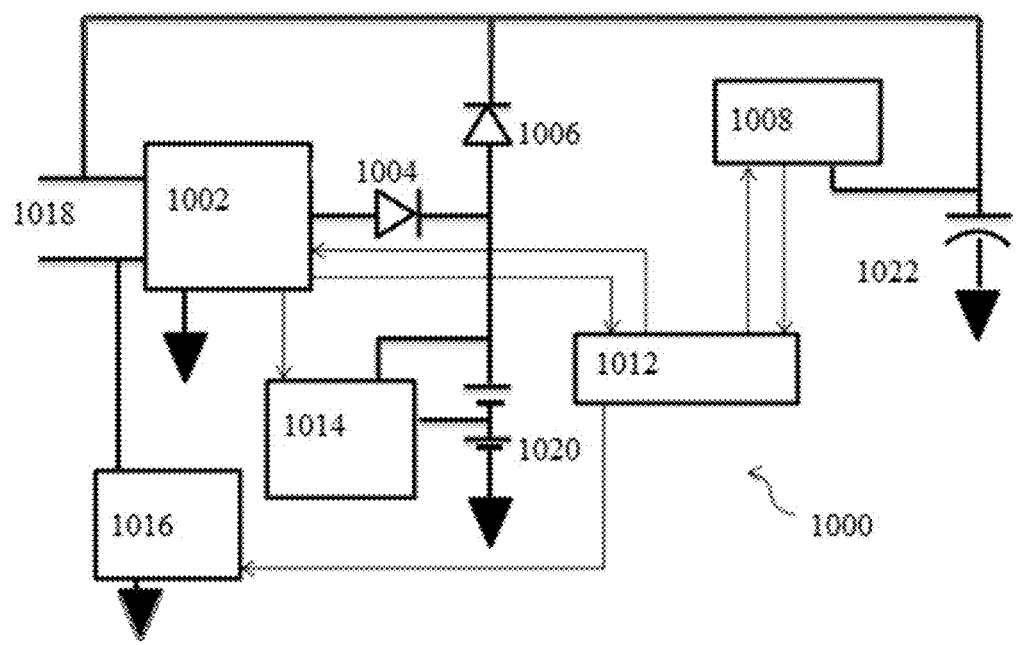
FIG. 10 illustrates a block diagram for a hybrid power pack in accordance with fourth embodiment of the present disclosure.

FIG. 10 illustrates a block diagram for a hybrid power pack (1000) in accordance with fourth embodiment of the present disclosure. The hybrid power pack (1000) includes a plurality of cells (1020) as a first storage component, a capacitor bank (1022) as a second storage component, a battery management system (1002), a cell balancing circuit (1014), a capacitor balancing circuit (1008), a controller (1012), a unipolar transistor (1016), an inout port (1018), a first unidirectional switch (1004) and a second unidirectional switch (1006), according to the fourth embodiment of the present disclosure. The battery management system (1002) comprises an input port and an output port. The input port of the battery management system (1002) is connected to the inout port (1018). The output port of the battery management system (1002) is connected to an anode terminal of first unidirectional switch (1004). A cathode terminal of the first unidirectional switch (1004) is connected to a positive terminal of plurality of cells (1020). The positive terminal of the cells (1020) is connected to an anode terminal of the second unidirectional switch (1006). A cathode terminal of the second unidirectional switch (1006) is connected to the inout port (1018). The capacitor bank (1022) is connected to the inout port (1018). A drain terminal of the unipolar transistor (1016) is connected to the inout port (1018). A source terminal of the unipolar transistor (1016) is connected to a ground terminal. The controller (1012) is cooperating with the cell balancing circuit (1014), the capacitor balancing circuit (1008), the battery management system (1002) and a gate terminal of the unipolar transistor (1016). The controller (1012) is configured to select the cells (1020), the capacitor bank (1022) or both of them simultaneously to deliver a power to a load. The load is connected to the inout port (1018).

In the fourth embodiment of the present disclosure, a charging current for cells (1020) flows from an inout port (1018) to a battery management system (1002) and further, from the battery management system (1002) to a positive terminal of the cells via a first unidirectional switch (1004).

In the fourth embodiment of the present disclosure, a discharging current of cells (1020) flows from a positive terminal of the cells to an inout port (1018) via a second unidirectional switch (1006).

In the fourth embodiment of the present disclosure, a charging current for a capacitor bank (1022) flows from an inout port (1018) to the capacitor bank (1022).

In the fourth embodiment of the present disclosure, a discharging current of a capacitor bank (1022) flows from a capacitor bank (1022) to an inout port (1018).

Figure 11:
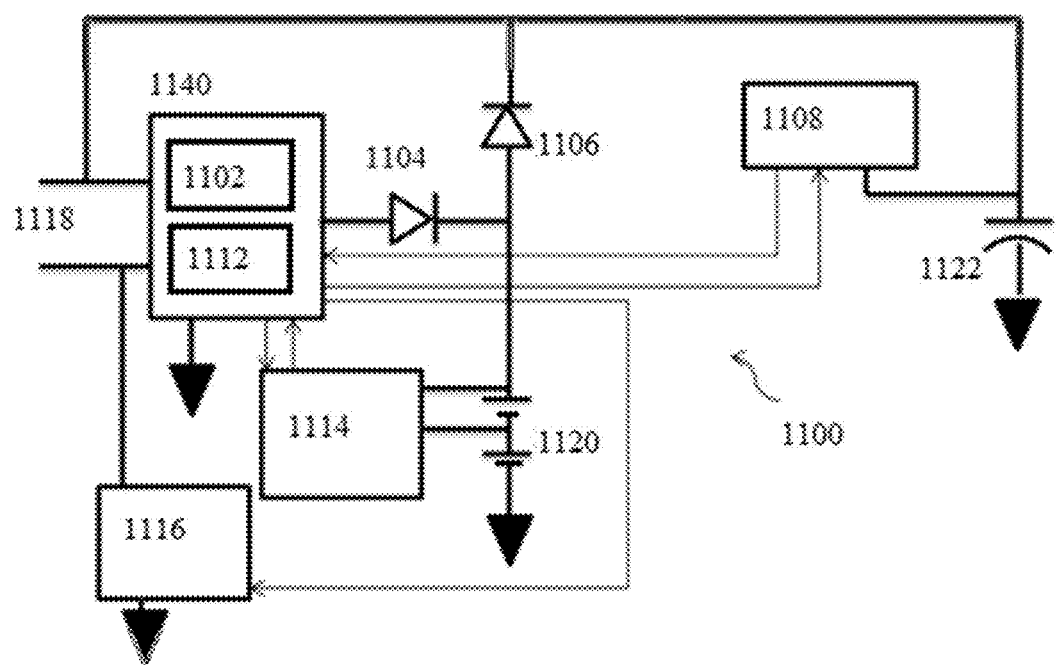
FIG. 11 illustrates a block diagram for a hybrid power pack in accordance with fifth embodiment of the present disclosure.

FIG. 11 illustrates a block diagram for a hybrid power pack (1100) in accordance with fifth embodiment of the present disclosure. The hybrid power pack (1100) includes a battery management system (1102) and a controller (1112) integrated into one block as a first application specific integrated circuit (1140), a plurality of cells (1120) as a first storage component, a capacitor bank (1122) as a second storage component, a cell balancing circuit (1114), a capacitor balancing circuit (1108), an inout port (1118), a unipolar transistor (1116), a first unidirectional switch (1104) and a second unidirectional switch (1106), according to the fifth embodiment of the present disclosure. Further, the first application specific integrated circuit (1140) comprises an input port and an output port. The input port of the first application specific integrated circuit (1140) is connected to the inout port (1118). The output port of first application specific integrated circuit (1140) is connected to an anode terminal of first unidirectional switch (1104). A cathode terminal of the first unidirectional switch (1104) is connected to a positive terminal of plurality of cells (1120). The positive terminal of the cells (1120) is connected to an anode terminal of the second unidirectional switch (1106). A cathode terminal of the second unidirectional switch (1106) is connected to the inout port (1118). The capacitor bank (1122) is connected to the bidirectional switch (1110), and the bidirectional switch (1110) is connected to the inout port (1118). A drain terminal of the unipolar transistor (1116) is connected to the inout port (1118). A source terminal of the unipolar transistor (1116) is connected to a ground terminal. The first application specific integrated circuit (1140) is cooperating with the cell balancing circuit (1114), the capacitor balancing circuit (1108) and a gate terminal of the unipolar transistor (1116). The first application specific integrated circuit (1140) is configured to select the cells (1120), the capacitor bank (1122) or both of them simultaneously to deliver a power to a load. The load is connected to the inout port (1118).

In the fifth embodiment of the present disclosure, a charging current for cells (1120) flows from an inout port (1118) to a first application specific integrated circuit (1140) and further, from a first application specific integrated circuit (1140) to a positive terminal of the cells via a first unidirectional switch (1104).

In the fifth embodiment of the present disclosure, a discharging current of cells (1120) flows from a positive terminal of the cells to an inout port (1118) via a second unidirectional switch (1106).

In the fifth embodiment of the present disclosure, a charging current for a capacitor bank (1122) flows from an inout port (1118) to the capacitor bank (1122).

In the fifth embodiment of the present disclosure, a discharging current of a capacitor bank (1122) flows from a capacitor bank (1122) to an inout port (1118).

Figure 12:
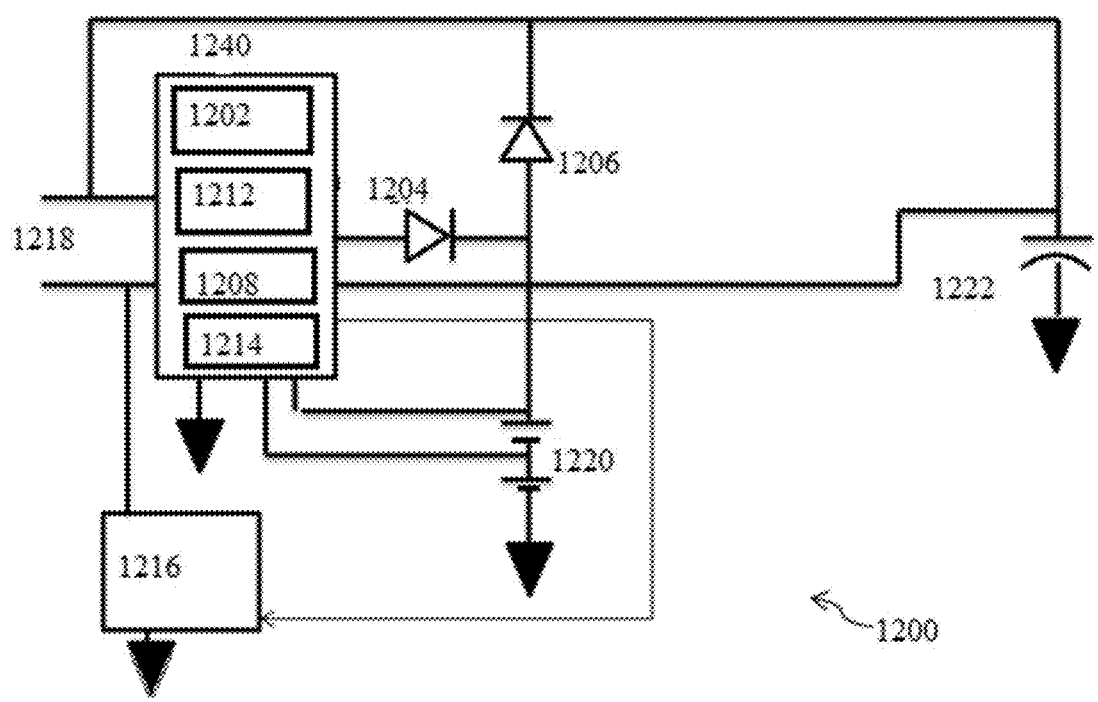
FIG. 12 illustrates a block diagram for a hybrid power pack in accordance with sixth embodiment of the present disclosure.

FIG. 12 illustrates a block diagram for a hybrid power pack (1200) in accordance with sixth embodiment of the present disclosure. The hybrid power (1200) pack includes a battery management system (1202), a controller (1212), a capacitor balancing circuit (1208) and a cell balancing circuit (1214) integrated into one block as a second application specific integrated circuit (1240), a plurality of cells (1220) as a first storage component, a capacitor bank (1222) as a second storage component, an inout port (1218), a unipolar transistor (1216), a first unidirectional switch (1204) and a second unidirectional switch (1206), according to the sixth embodiment of the present disclosure. Further, the second application specific integrated circuit (1202) comprises an input port and an output port. The input port of the second application specific integrated circuit (1240) is connected to the inout port (1218). The output port of second application specific integrated circuit (1240) is connected to an anode terminal of first unidirectional switch (1204). A cathode terminal of the first unidirectional switch (1204) is connected to a positive terminal of plurality of cells (1220). The positive terminal of the cells (1220) is connected to an anode terminal of the second unidirectional switch (1206). A cathode terminal of the second unidirectional switch (1206) is connected to the inout port (1218). The capacitor bank (1222) is connected to the inout port (1218). A drain terminal of the unipolar transistor (1216) is connected to the inout port (1218). A source terminal of the unipolar transistor (1216) is connected to a ground terminal. The second application specific integrated circuit (1240) is cooperating with a gate terminal of the unipolar transistor (1216). The second application specific integrated circuit (1240) is configured to select the cells (1220), the capacitor bank (1222) or both of them simultaneously to deliver a power to a load. The load is connected to the inout port (1218).

In the sixth embodiment of the present disclosure, a charging current for cells (1220) flows from an inout port (1218) to a second application specific integrated circuit (1240) and further, from the second application specific integrated circuit (1240) to a positive terminal of the cells via a first unidirectional switch (1204).

In the sixth embodiment of the present disclosure, a discharging current of cells (1220) flows from a positive terminal of the cells to an inout port (1218) via a second unidirectional switch (1206).

In the sixth embodiment of the present disclosure, a charging current for a capacitor bank (1222) flows from an inout port (1218) to the capacitor bank (1222).

In the sixth embodiment of the present disclosure, a discharging current of a capacitor bank (1222) flows from the capacitor bank (1222) to an inout port (218).

Figure 13:
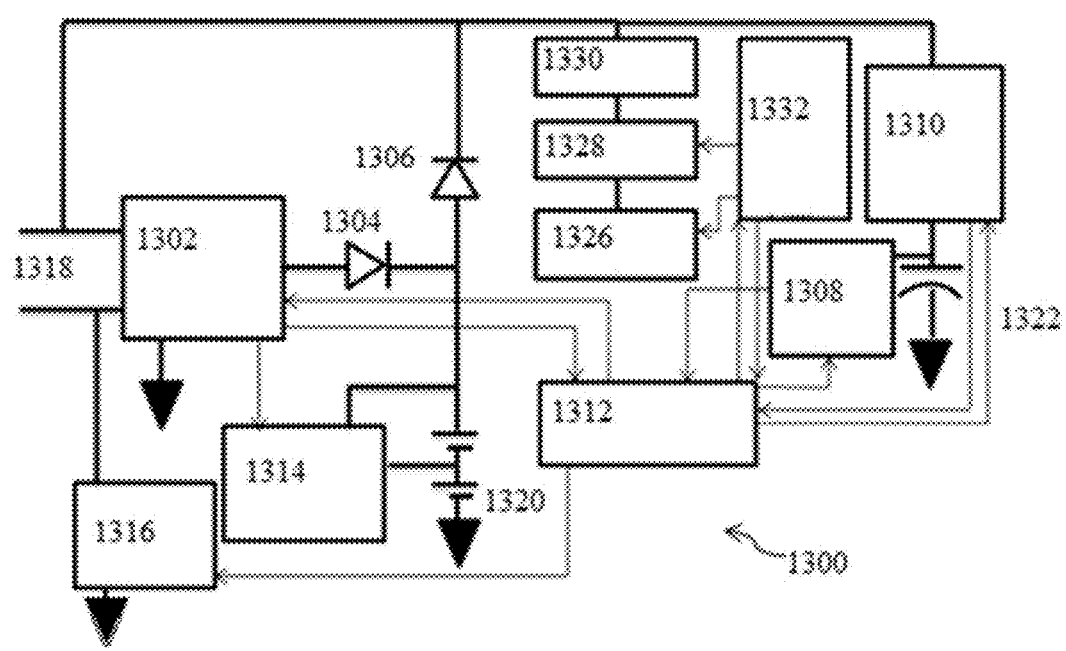
FIG. 13 illustrates a block diagram for a hybrid power pack in accordance with seventh embodiment of the present disclosure.

FIG. 13 illustrates a block diagram for a hybrid power pack (1300) in accordance with seventh embodiment of the present disclosure. The hybrid power pack (1300) includes a plurality of cells (1302) as a first storage component, a capacitor bank (1322) as a second storage component, a coil wound ferrite core (1326) as a first power supply/source, an amplifier (1328), a rectifier (1330), a control circuit for coil wound ferrite core (1332), a controller (1312), a battery management system (1302), a cell balancing circuit (1314), a capacitor balancing circuit (1308), an inout port (1318), a unipolar transistor (1316), a bidirectional switch (1310), a first unidirectional switch (1304) and a second unidirectional switch (1306), according to the seventh embodiment of the present disclosure. The battery management system (1302) comprises an input port and an output port. The input port of the battery management system is connected to the inout port (1318). The output port of the battery management system (1302) is connected to an anode terminal of first unidirectional switch (1304). A cathode terminal of the first unidirectional switch (1304) is connected to a positive terminal of plurality of cells (1320). The positive terminal of the cells (1320) is connected to an anode terminal of the second unidirectional switch (1306). A cathode terminal of the second unidirectional switch (1306) is connected to the inout port (1318). The capacitor bank (1322) is connected to the bidirectional switch (1310), and the bidirectional switch (1310) is connected to the inout port (1318). A coil wound ferrite core (1326) is connected to an amplifier (1328), the amplifier (1328) is connected to a rectifier (1330), and the rectifier (1330) is connected to the inout port (1318). A drain terminal of the unipolar transistor (1316) is connected to the inout port (1318). A source terminal of the unipolar transistor (1316) is connected to a ground terminal. The controller (1312) is cooperating with the cell balancing circuit (1314), the capacitor balancing circuit (1308), the battery management system (1302), the bidirectional switch (1310), the control circuit for coil wound ferrite core (1332) and a gate terminal of the unipolar transistor (1316). The controller (1312) is configured to select the cells (1320), the capacitor bank (1322), the coil wound ferrite core (1326) or combination of them to deliver a power to a load. The load is connected to the inout port (1318).

In the seventh embodiment of the present disclosure, a charging current for cells (1320) flows from an inout port (1318) to a battery management system (1302) and further, from the battery management system (1302) to a positive terminal of the cells via a first unidirectional switch (1304).

In the seventh embodiment of the present disclosure, a discharging current of cells (1320) flows from a positive terminal of the cells to an inout port (1318) via a second unidirectional switch (1306).

In the seventh embodiment of the present disclosure, a charging current for a capacitor bank (1322) flows from an inout port (1318) to a bidirectional switch (1310) and further, from the bidirectional switch (1310) to the capacitor bank (1322).

In the seventh embodiment of the present disclosure, a discharging current of a capacitor bank (1322) flows from a capacitor bank (1322) to a bidirectional switch (1310) and further, from the bidirectional switch (1310) to an inout port (1318).

In accordance with the present disclosure, a coil wound ferrite core (1326) is used as a first power supply/source to provide a power to a hybrid power pack (1300). The coil wound ferrite core (1326) may be a transformer, a winding of coils or a coil wound electromagnetic core. Typically, the coil wound ferrite core (1326) includes a coil and a magnetic core. The coil is wound on a normal plastic bobbin or a soft ferrite magnet or the magnetic core. The coil wound ferrite core generates a first AC signal. The first AC signal generated by the coil wound ferrite core (1326) is amplified by an amplifier (1328) to generate an amplified first AC signal. The amplified first AC signal is converted into a stable DC signal by a rectifier (1330). The rectifier (1330) may be a bridge rectifier or a full wave rectifier. The control circuit for coil wound ferrite core (1326) includes an AC signal level detector and a gain control circuit. The AC signal level detector detects a current/voltage level of the first AC signal generated by the coil wound ferrite core. Based on the detected level the control circuit for coil wound ferrite core (1332) controls the gain control circuit. The gain control circuit generates a gain control signal which controls a gain of the amplifier (1328). Further, a gain control circuit is cooperating with a controller (1312).

Figure 14:
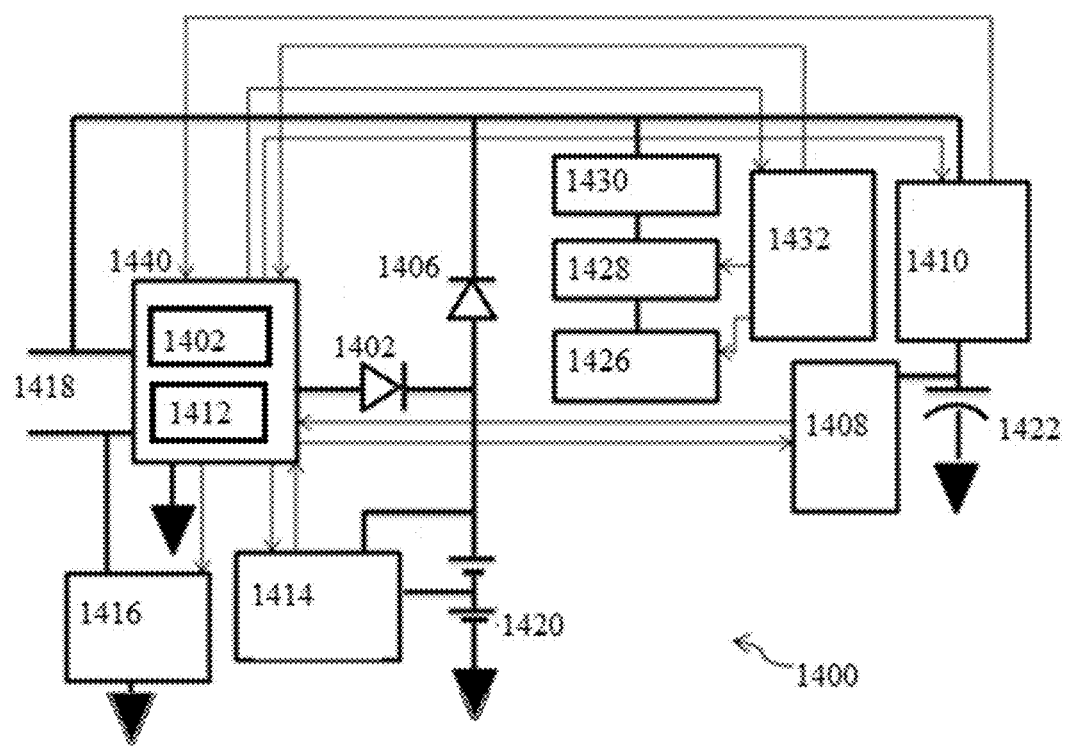
FIG. 14 illustrates a block diagram for a hybrid power pack in accordance with eighth embodiment of the present disclosure.

FIG. 14 illustrates a block diagram for a hybrid power pack (1400) in accordance with eighth embodiment of the present disclosure. The hybrid power pack (1400) includes a battery management system (1402) and a controller (1412) integrated into one block as a first application specific integrated circuit (1440), a plurality of cells (1420) as a first storage component, a capacitor bank (1422) as a second storage component, a coil wound ferrite core (1426) as a first power supply, an amplifier (1428), a rectifier (1430), a control circuit for coil wound ferrite core (1432), a cell balancing circuit (1414), a capacitor balancing circuit (1408), a bidirectional switch (1410), an inout port (1418), a unipolar transistor (1416), a first unidirectional switch (1404) and a second unidirectional switch (1406), according to the eighth embodiment of the present disclosure. Further, the first application specific integrated circuit (1402) comprises an input port and an output port. The input port of the first application specific integrated circuit (1440) is connected to the inout port (1418). The output port of first application specific integrated circuit (1440) is connected to an anode terminal of first unidirectional switch (1404). A cathode terminal of the first unidirectional switch (1404) is connected to a positive terminal of plurality of cells (1420). The positive terminal of the cells (1420) is connected to an anode terminal of the second unidirectional switch (1406). A cathode terminal of the second unidirectional switch (1406) is connected to the inout port (1418). The capacitor bank (1422) is connected to the bidirectional switch (1410), and the bidirectional switch (1410) is connected to the inout port (1418). A coil wound ferrite core (1426) is connected to an amplifier (1428), the amplifier (1428) is connected to a rectifier (1430), and the rectifier (1430) is connected to the inout port (1418). A drain terminal of the unipolar transistor (1416) is connected to the inout port (1418). A source terminal of the unipolar transistor (1416) is connected to a ground terminal. The first application specific integrated circuit (1440) is cooperating with the cell balancing circuit (214), the capacitor balancing circuit (1408), the bidirectional switch (1410), the control circuit for coil wound ferrite core (1432) and a gate terminal of the unipolar transistor (1416). The first application specific integrated circuit (1440) is configured to select the cells (1420), the capacitor bank (1422), the coil wound ferrite core (1426) or combination of them to deliver a power to a load. The load is connected to the inout port (1418).

In the eighth embodiment of the present disclosure, a charging current for cells (1420) flows from an inout port (1418) to a first application specific integrated circuit (1440) and further, from a first application specific integrated circuit (1440) to a positive terminal of the cells via a first unidirectional switch (1404).

In the eighth embodiment of the present disclosure, a discharging current of cells (1420) flows from a positive terminal of the cells to an inout port (1418) via a second unidirectional switch (1406).

In the eighth embodiment of the present disclosure, a charging current for a capacitor bank (1422) flows from an inout port (1418) to a bidirectional switch (1410) and further, from the bidirectional switch (1410) to the capacitor bank (1422).

In the eighth embodiment of the present disclosure, a discharging current of a capacitor bank (1422) flows from the capacitor bank (1422) to a bidirectional switch (1410) and further, from the bidirectional switch (1410) to an inout port (1418).

Figure 15:
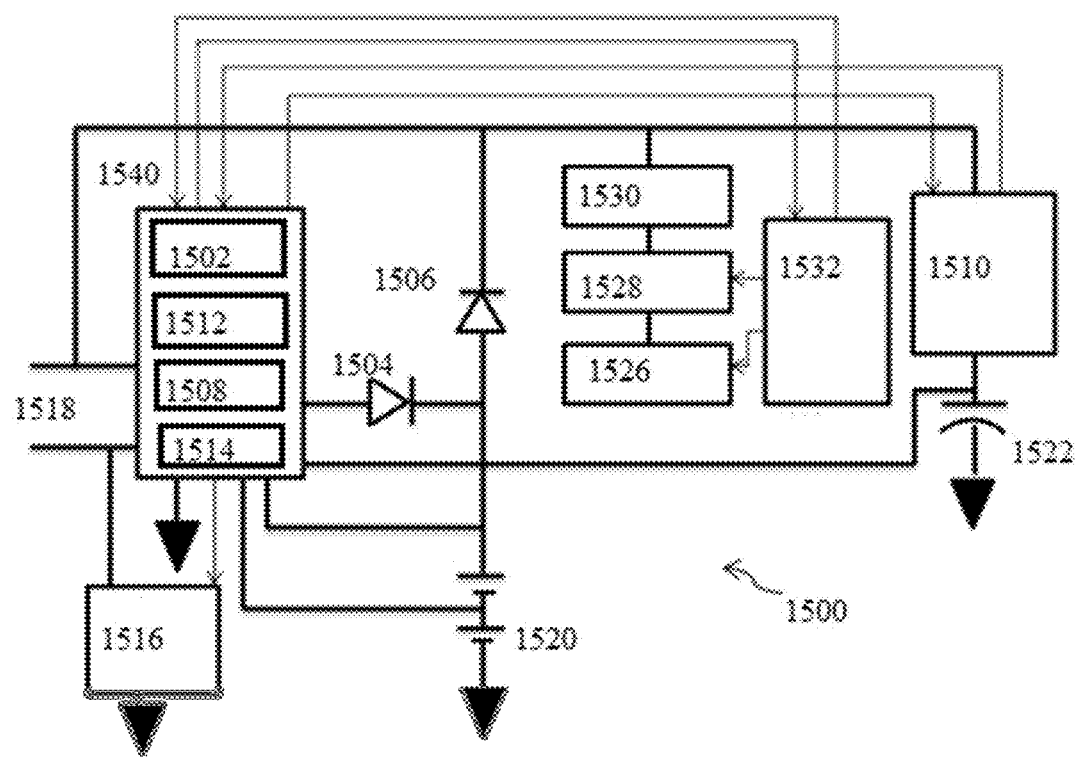
FIG. 15 illustrates a block diagram for a hybrid power pack in accordance with ninth embodiment of the present disclosure.

FIG. 15 illustrates a block diagram for a hybrid power pack (1500) in accordance with ninth embodiment of the present disclosure. The hybrid power pack (1500) includes a battery management system (1502), a controller (1512), a capacitor balancing circuit (1508) and cell balancing circuit (1514) integrated into one block as a second application specific integrated circuit (1540), a plurality of cells (1520) as a first storage component, a capacitor bank (1522) as a second storage component, a coil wound ferrite core (1526) as a first power supply, an amplifier (1528), a rectifier (1530), a control circuit for coil wound ferrite core (1532), a bidirectional switch (1510), an inout port (1518), a unipolar transistor (1516), a first unidirectional switch (1504) and a second unidirectional switch (1506), according to the ninth embodiment of the present disclosure. Further, the second application specific integrated circuit (1540) comprises an input port and an output port. The input port of the second application specific integrated circuit (1540) is connected to the inout port (1518). The output port of second application specific integrated circuit (1540) is connected to an anode terminal of first unidirectional switch (1504). A cathode terminal of the first unidirectional switch (1504) is connected to a positive terminal of plurality of cells (1520). The positive terminal of the cells is connected to an anode terminal of the second unidirectional switch (1506). A cathode terminal of the second unidirectional switch (1506) is connected to the inout port (1518). The capacitor bank (1522) is connected to the bidirectional switch (1510), and the bidirectional switch (1510) is connected to the inout port (1518). A coil wound ferrite core (1526) is connected to an amplifier (1528), the amplifier (1528) is connected to a rectifier (1530), and the rectifier (1530) is connected to the inout port (1518). A drain terminal of the unipolar transistor (1516) is connected to the inout port (1518). A source terminal of the unipolar transistor (1516) is connected to the ground terminal. The second application specific integrated circuit (1540) is cooperating with the bidirectional switch (1510), a control circuit for coil wound ferrite core (1532) and a gate terminal of the unipolar transistor (1516). The second application specific integrated circuit (1540) is configured to select the cells (1520), the capacitor bank (1522), the coil wound ferrite core (1526) or combination of them to deliver a power to a load. The load is connected to the inout port (1518).

In the ninth embodiment of the present disclosure, a charging current for cells (1520) flows from an inout port (1518) to a second application specific integrated circuit (1540) and further, from the second application specific integrated circuit (1540) to a positive terminal of the cells via a first unidirectional switch (1504).

In the ninth embodiment of the present disclosure, a discharging current of cells (1520) flows from a positive terminal of the cells to an inout port (1518) via a second unidirectional switch (1506).

In the ninth embodiment of the present disclosure, a charging current for a capacitor bank (1522) flows from an inout port (1518) to a bidirectional switch (1510) and further, from the bidirectional switch (1510) to the capacitor bank (1522).

In the ninth embodiment of the present disclosure, a discharging current of a capacitor bank (1522) flows from the capacitor bank (1522) to a bidirectional switch (1510) and further, from the bidirectional switch (1510) to an inout port (1518).

Figure 16:
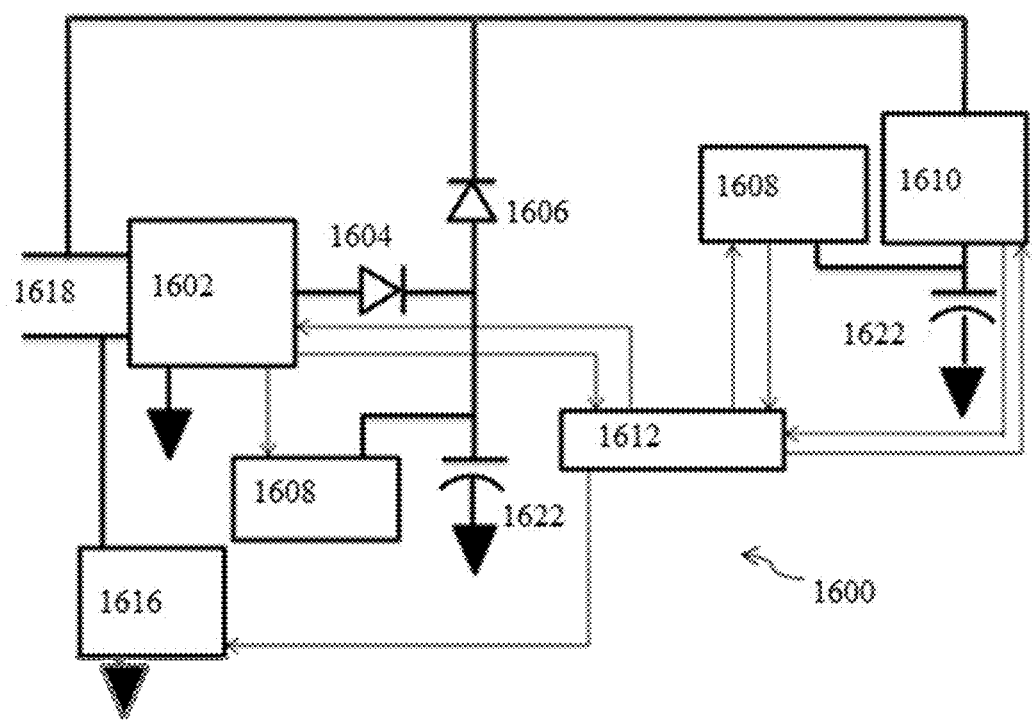
FIG. 16 illustrates a block diagram for a hybrid power pack in accordance with tenth embodiment of the present disclosure.

FIG. 16 illustrates a block diagram for a hybrid power pack (1600) in accordance with tenth embodiment of the present disclosure. The hybrid power pack (1600) includes a first storage component, a second storage component, a battery management system (1602), a capacitor balancing circuit (1608), a controller (1612), a bidirectional switch (1610), an inout port (1618), a unipolar transistor (1616), a first unidirectional switch (1604) and a second unidirectional switch (1606), according to the tenth embodiment of the present disclosure. The first storage component includes a plurality of capacitors (1622). The second storage component includes a plurality of capacitors (1622). The battery management system (1602) comprises an input port and an output port. The input port of the battery management system is connected to the inout port (1618). The output port of the battery management system (1602) is connected to an anode terminal of first unidirectional switch (1604). A cathode terminal of the first unidirectional switch (1604) is connected to a positive terminal of the first storage component. The positive terminal of the first storage component is connected to an anode terminal of the second unidirectional switch (1606). A cathode terminal of the second unidirectional switch (1606) is connected to the inout port (1618). The second storage component is connected to the bidirectional switch (1610), and the bidirectional switch (1610) is connected to the inout port (1618). A drain terminal of the unipolar transistor (1616) is connected to the inout port (1618). A source terminal of the unipolar transistor (1616) is connected to a ground terminal. The controller (1612) is cooperating with the capacitor balancing circuit (1608), the battery management system (1602), the bidirectional switch (1610) and a gate terminal of the unipolar transistor (1616). The controller (1612) is configured to select first storage component, the second storage component or combination of them to deliver a power to a load. The load is connected to the inout port (1618).

In the tenth embodiment of the present disclosure, a charging current for a first storage component flows from an inout port (1618) to a battery management system (1602) and further, from the battery management system (1602) to a positive terminal of the first storage component via a first unidirectional switch (1604).

In the tenth embodiment of the present disclosure, a discharging current of a first storage component flows from a positive terminal of the first storage component to an inout port (1618) via a second unidirectional switch (1606).

In the tenth embodiment of the present disclosure, a charging current for a second storage component flows from an inout port (1618) to a bidirectional switch (1610) and further, from the bidirectional switch (1610) to the second storage component (1622).

In the tenth embodiment of the present disclosure, a discharging current of a second storage component flows from the second storage component to a bidirectional switch (1610) and further, from the bidirectional switch (1610) to an inout port (1618).

Figure 17:
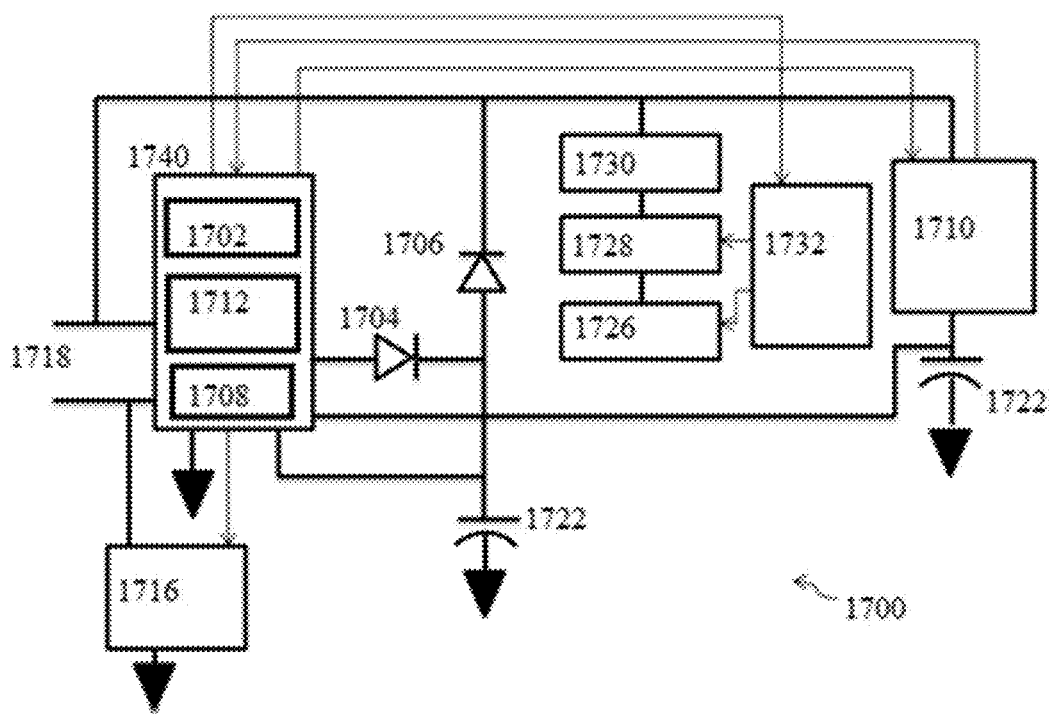
FIG. 17 illustrates a block diagram for a hybrid power pack in accordance with eleventh embodiment of the present disclosure.

FIG. 17 illustrates a block diagram for a hybrid power pack (1700) in accordance with eleventh embodiment of the present disclosure. The hybrid power pack (1700) includes a battery management system (1702), a controller (1712) and a capacitor balancing circuit (1708) integrated into one block as a third application specific integrated circuit (1740), a first storage component as a plurality of capacitors (1722), a second storage component as a plurality of capacitors (1722), a coil wound ferrite core (1726) as a first power supply, an amplifier (1728), a rectifier (1730), a control circuit for coil wound ferrite core (1732), a bidirectional switch (1710), an inout port (1718), a unipolar transistor (1716), a first unidirectional switch (1704) and a second unidirectional switch (1706), according to the eleventh embodiment of the present disclosure. The third application specific integrated circuit (1740) comprises an input port and an output port. The input port of third application specific integrated circuit (1740) is connected to the inout port (1718). The output port of the third application specific integrated circuit (1740) is connected to an anode terminal of first unidirectional switch (1704). A cathode terminal of the first unidirectional switch (1704) is connected to a positive terminal of the first storage component. The positive terminal of the first storage component is connected to an anode terminal of the second unidirectional switch (1706). A cathode terminal of the second unidirectional switch (1706) is connected to the inout port (1718). The second storage component is connected to the bidirectional switch (1710), and the bidirectional switch (1710) is connected to the inout port (1718). A drain terminal of the unipolar transistor (1716) is connected to the inout port (1718). A source terminal of the unipolar transistor (1716) is connected to a ground terminal. The third application specific integrated circuit (1740) is cooperating with the bidirectional switch (1710) and a gate terminal of the unipolar transistor (1716). The third application specific integrated circuit (1740) is configured to select first storage component, the second storage component, the coil wound ferrite core (1726) or combination of them to deliver a power to a load. The load is connected to the inout port (1718).

In the eleventh embodiment of the present disclosure, a charging current for a first storage component flows from an inout port (1718) to a third application specific integrated circuit (1740) and further, from the third application specific integrated circuit (1740) to a positive terminal of the first storage component via a first unidirectional switch (1704).

In the eleventh embodiment of the present disclosure, a discharging current of a first storage component flows from a positive terminal of the first storage component to an inout port (1718) via a second unidirectional switch (1706).

In the eleventh embodiment of the present disclosure, a charging current for a second storage component flows from an inout port (1718) to a bidirectional switch (1710) and further, from the bidirectional switch (1710) to the second storage component (1722).

In the eleventh embodiment of the present disclosure, a discharging current of a second storage component flows from the second storage component to a bidirectional switch (1710) and further, from the bidirectional switch (1710) to an inout port (1718).

Figure 18:
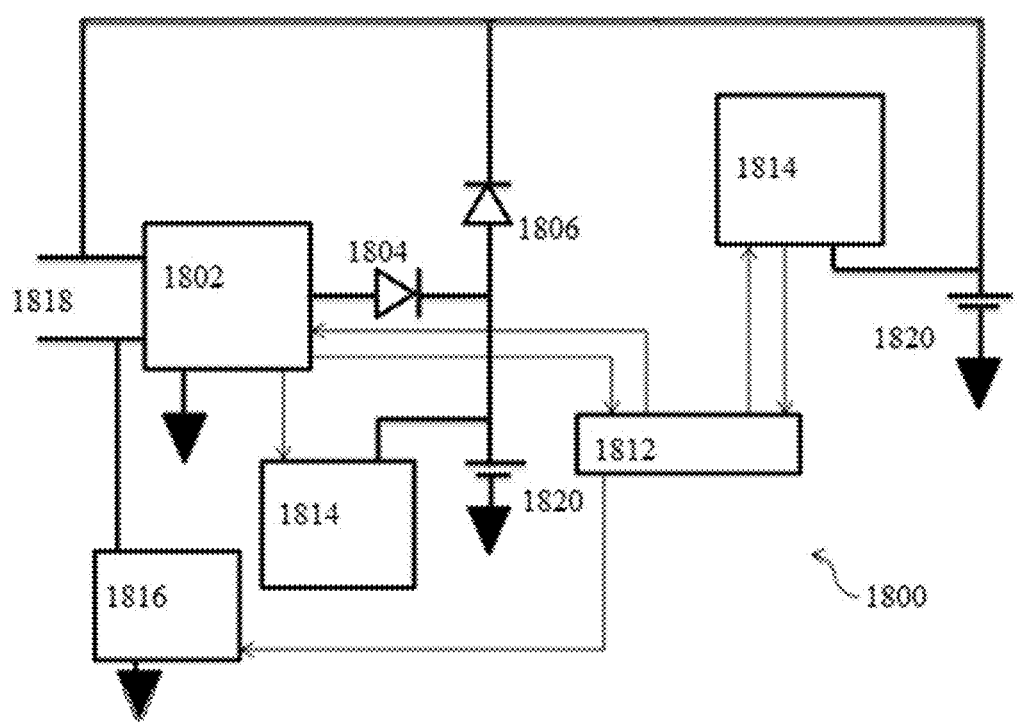
FIG. 18 illustrates a block diagram for a hybrid power pack in accordance with twelfth embodiment of the present disclosure.

FIG. 18 illustrates a block diagram for a hybrid power pack (1800) in accordance with twelfth embodiment of the present disclosure. The hybrid power (1800) pack includes a first storage component as a plurality of cells (1820), a second storage component as a plurality of cells (1820), a battery management system (1802), a cell balancing circuit (1814), an inout port (1818), a unipolar transistor (1816), a controller (1812), a first unidirectional switch (1804) and a second unidirectional switch (1806), according to the twelfth embodiment of the present disclosure. The battery management system (1802) comprises an input port and an output port. The input port of the battery management system is connected to the inout port (1818). The output port of the battery management system (1802) is connected to an anode terminal of first unidirectional switch (1804). A cathode terminal of the first unidirectional switch (1804) is connected to a positive terminal of the first storage component. The positive terminal of the first storage component is connected to an anode terminal of the second unidirectional switch (1806). A cathode terminal of the second unidirectional switch (1806) is connected to the inout port (1818). The second storage component is connected to the inout port (1818). A drain terminal of the unipolar transistor (1816) is connected to the inout port (1818). A source terminal of the unipolar transistor (1816) is connected to a ground terminal. The controller (1812) is cooperating with the cell balancing circuit (1814), the battery management system (1802) and a gate terminal of the unipolar transistor (1816). The central controller (1812) is configured to select the first storage component, the second storage component or combination of them to deliver a power to a load. The load is connected to the inout port (1818).

In the twelfth embodiment of the present disclosure, a charging current for a first storage component flows from an inout port (1818) to a battery management system (1802) and further, from the battery management system (1802) to a positive terminal of the first storage component via a first unidirectional switch (1804).

In the twelfth embodiment of the present disclosure, a discharging current of a first storage component flows from a positive terminal of the first storage component to an inout port (1818) via a second unidirectional switch (1806).

In the twelfth embodiment of the present disclosure, a charging current for a second storage component flows from an inout port (1818) to the second storage component.

In the twelfth embodiment of the present disclosure, a discharging current of a second storage component flows from the second storage component to an inout port (1818).

Figure 19:
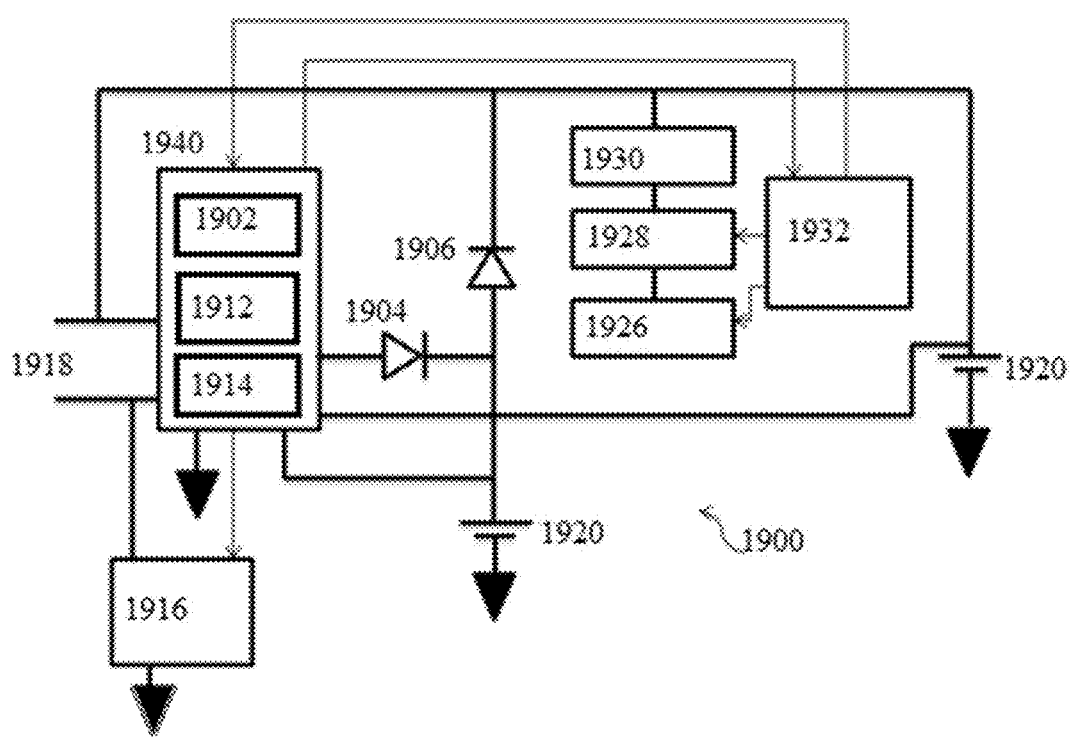
FIG. 19 illustrates a block diagram for a hybrid power pack in accordance with thirteenth embodiment of the present disclosure.

FIG. 19 illustrates a block diagram for a hybrid power pack (1900) in accordance with thirteenth embodiment of the present disclosure. The hybrid power pack (1900) includes a battery management system (1902), a controller (1912), and a cell balancing circuit (1914) integrated into one block as a fourth application specific integrated circuit (1940), a first storage component as a plurality of cells (1920), a second storage component as a plurality of cells (1920), a coil wound ferrite core (1926) as a first power supply, an amplifier (1928), a rectifier (1930), a control circuit for coil wound ferrite core (1932), an inout port (1918), a unipolar transistor (1916), a first unidirectional switch (1904) and a second unidirectional switch (1906), according to the thirteenth embodiment of the present disclosure. The fourth application specific integrated circuit (1940) comprises an input port and an output port. The input port of the fourth application specific integrated circuit (1940) is connected to the inout port (1918). The output port of the fourth application specific integrated circuit (1940) is connected to an anode terminal of first unidirectional switch (1904). A cathode terminal of the first unidirectional switch (1904) is connected to a positive terminal of the first storage component. The positive terminal of the first storage component is connected to an anode terminal of the second unidirectional switch (1906). A cathode terminal of the second unidirectional switch (1906) is connected to the inout port (1918). The second storage component is connected to the inout port (1918). A drain terminal of the unipolar transistor (1916) is connected to the inout port (1918). A source terminal of the unipolar transistor (1916) is connected to a ground terminal. The fourth application specific integrated circuit (1940) is cooperating with a gate terminal of the unipolar transistor (1916). The fourth application specific integrated circuit (1940) is configured to select the first storage component, the second storage component, the coil wound ferrite core (1926) or combination of them to deliver a power to a load. The load is connected to the inout port (1918).

In the thirteenth embodiment of the present disclosure, a charging current for a first storage component flows from an inout port (1918) to a fourth application specific integrated circuit (1940) and further, from the fourth application specific integrated circuit (1940) to a positive terminal of the first storage component via a first unidirectional switch (1904).

In the thirteenth embodiment of the present disclosure, a discharging current of a first storage component flows from a positive terminal of the first storage component to an inout port (1918) via a second unidirectional switch (1906).

In the thirteenth embodiment of the present disclosure, a charging current for a second storage component flows from an inout port (1918) to the second storage component (1922).

In the thirteenth embodiment of the present disclosure, a discharging current of a second storage component flows from the second storage component to an inout port (1918).

Figure 20:
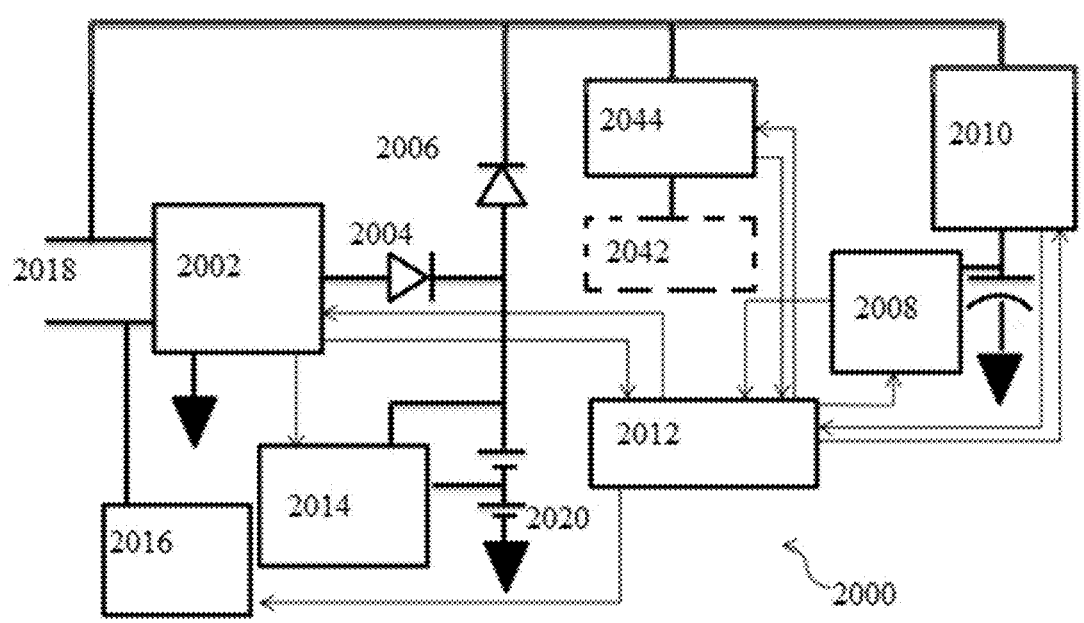
FIG. 20 illustrates a block diagram for a hybrid power pack in accordance with fourteenth embodiment of the present disclosure.

FIG. 20 illustrates a block diagram for a hybrid power pack (2000) in accordance with fourteenth embodiment of the present disclosure. The hybrid power pack (2000) includes a plurality of cells (2020) as a first storage component, a capacitor bank (2022) as a second storage component, a first AC to DC converter (2044) connectable to an AC power source (2042), a battery management system (2002), a cell balancing circuit (2014), a controller (2012), a capacitor balancing circuit (2008), a bidirectional switch (2010), an inout port (2018), a unipolar transistor (2016), a first unidirectional switch (2004) and a second unidirectional switch (2006), according to the fourteenth embodiment of the present disclosure. The controller (2012) is configured to select cells (2020), the capacitor bank (2022), the AC power source (2042) or combination of them to deliver a power to a load. The load is connected to the inout port (2018).

In accordance with the present disclosure, an AC power source (2042) is used as a second power supply/source to provide a power to a hybrid power pack (2000). A first AC to DC converter (2044) is connected to the AC power source (2042) to generate a sustained DC power.

Figure 21:
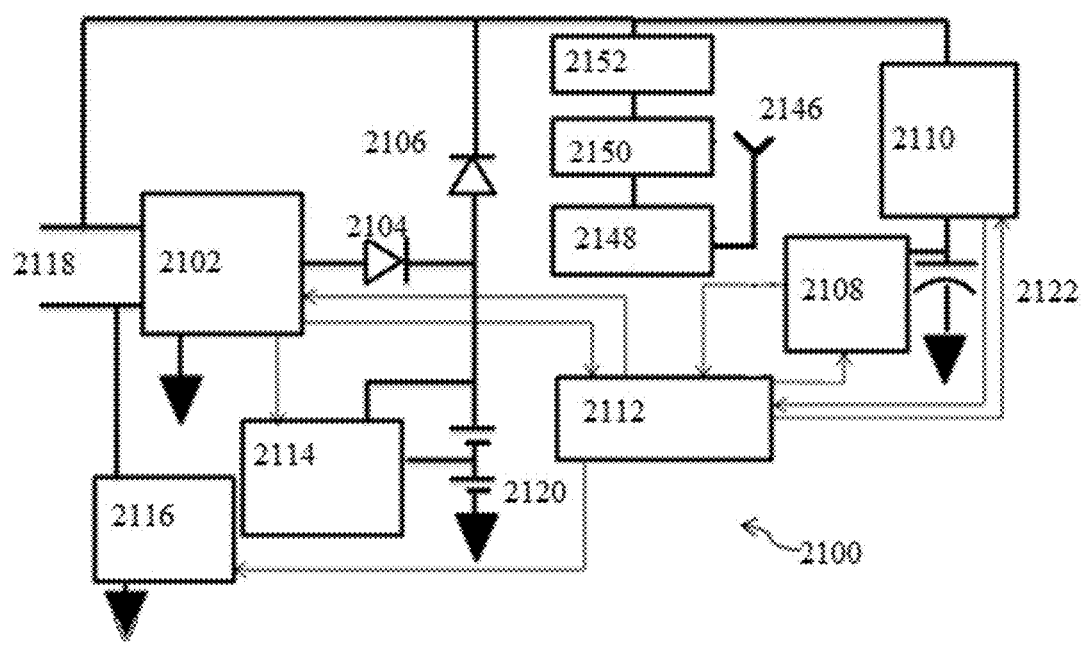
FIG. 21 illustrates a block diagram for a hybrid power pack in accordance with fifteenth embodiment of the present disclosure.

FIG. 21 illustrates a block diagram for a hybrid power pack (2100) in accordance with fifteenth embodiment of the present disclosure. The hybrid power (2100) pack includes a plurality of cells (2120) as a first storage component, a capacitor bank (2122) as a second storage component, an antenna (2146), an RF receiver module (2148), an RF amplifier (2150), a second AC to DC converter (2152), a battery management system (2102), a cell balancing circuit (2114), a capacitor balancing circuit (2108), a controller (2112) a bidirectional switch (2110), an inout port (2118), a unipolar transistor (2116), a first unidirectional switch (2104) and a second unidirectional switch (2106), according to the fifteenth embodiment of the present disclosure. The antenna (2146) is configured to capture radio frequencies. The RF receiver module (2148) is connected to the antenna (2146). The RF receiver module (2148) is configured to generate a second AC signal from said captured radio frequencies. The RF amplifier (2150) is connected to the RF receiver module (2148). The RF amplifier (2150) is configured to amplify said second AC signal. The second AC to DC converter (2152) is connected to the RF amplifier (2150). The second AC to DC converter (2152) converts said second AC signal into a DC signal. The arrangement of antenna (2146), the RF receiver module (2148), the RF amplifier (2150) and the second AC to DC converter (2152) acts as a third power source/supply. The controller (2112) is configured to select cells (2120), the capacitor bank (2122), the third power source/supply or combination of them to deliver a power to a load. The load is connected to the inout port (2118).

In accordance with the present disclosure, the hybrid power pack may include a step up DC to DC converter connectable to a fourth power source (DC power source) such as solar cell (photovoltaic cell), fuel cell for generating sustained DC power.

In accordance with the present disclosure, energy from a cooling fan based on a permanent magnet may be used as a fifth power supply/source to provide a power to a hybrid power pack. The cooling fan based on a permanent magnet generates a third AC signal, a power amplifier amplifies said third AC signal and a power rectifier converts said third AC signal into a DC signal.

In accordance with the present disclosure, a first power source/supply, a second power source/supply, a third power source/supply, a fourth power source/supply and the fifth power supply may be used alone or in combination to provide a power to a hybrid power pack.

In accordance with the present disclosure, a rotating magnetic motor and wheels based on the rotating magnetic motor may provide a power to the hybrid power pack.

Figure 22:
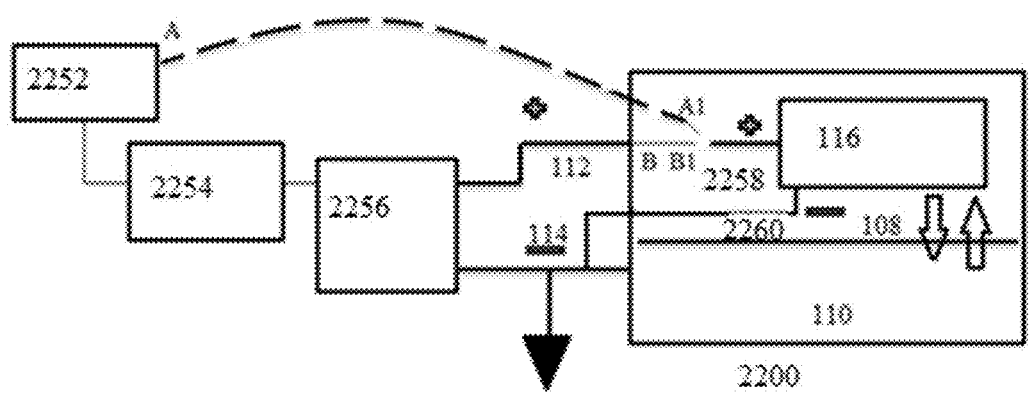
FIG. 22 illustrates a block diagram for charging a hybrid power pack according to an embodiment of the present disclosure.

FIG. 22 illustrates a block diagram for charging the hybrid power pack (2200) according to an embodiment of the present disclosure. The block diagram for charging the hybrid power pack (2200) includes a switch (2252), an alternator (2254), a third AC to DC converter (2256), an inout port (2218), a port control circuit, a wire A-A1 and a wire B-B1. The switch (2252) is connected to the alternator (2254), the alternator (2254) is connected to the third AC to DC converter (2256) and the third AC to DC converter (2256) is connected to the hybrid power pack (2200). The hybrid power pack (2200) includes a positive terminal (112) and a negative terminal (114). In normal working condition (voltage range from 12 to 18 volts) the positive terminal (112) of the hybrid power pack is connected to a positive terminal (2258) of a controlling circuit (2216) and the negative terminal (114) of the hybrid power pack (2200) is connected to the negative terminal of a controlling circuit (2216). the inout port (2218) of the hybrid power pack (2200) comprises a port control circuit and a pair of bidirectional wires. The port control circuit is cooperating with a battery management system of the controlling circuit (2216). In normal working range (for example: voltage range from 12 to 18 volts) the port control circuit connects the positive terminal (112) of the hybrid power pack (2200) to a positive terminal (2258) of a controlling circuit using the wire B-B1 and the negative terminal (114) of the hybrid power pack (2200) to the negative terminal of a controlling circuit (2216). When the voltage detected by the port control circuit at the positive terminal (112) of the hybrid power pack (2200) is less than a threshold voltage then the port control circuit disconnects the positive terminal (112) of the hybrid power pack from the positive terminal (2258) of the controlling circuit and the negative terminal (114) of the hybrid power pack (2200) from the negative terminal of the controlling circuit (2260) and connects the wire A-A1 to the positive terminal of the controlling circuit (2258). Further, if the voltage at the positive terminal (112) of the hybrid power pack (2200) is equal to or greater than the threshold voltage then the wire A-A1 is completely disconnected from the positive terminal (2258) of the controlling circuit and the wire B-B1 is connected to the positive terminal of the controlling circuit. Further, the threshold voltage is set by the battery management system.

In one working example, a hybrid power pack of the present disclosure and a conventional battery are tested alternately on different vehicles after their fuel pipes and the alternator fuse was removed which ensured that the vehicle would not start after a cranking attempt. Table 1 indicates the experimental performance parameters of the conventional battery compared to the experimental performance parameters of the hybrid power pack. The experimental performance parameters are measured using a meco tom tester. The experimental performance parameters are average discharge current for cranking, cranking attempts and capacity required to crank the vehicle. The cranking attempts relates to the number of cranking attempts supported by a completely charged cells/pack without further charging. The hybrid power pack provides 40 cranking attempts, whereas the conventional battery provides 15 cranking attempts only on an average. After 15 attempts the conventional battery reaches a charge value at which no cranking attempt is possible.

TABLE 1

| Sr. No | Type of vehicle | Average discharge current at the time of cranking | Cranking attempts for Hybrid Power Pack | Cranking attempts for Conventional Battery | Capacity required for conventional battery to crank the vehicle | Capacity required for hybrid power pack to crank the vehicle |
|---|---|---|---|---|---|---|
| 1 | Maruti Ritz (1000 CC Engine) | 128 AH | 40 | 15 | 32 AH | 2.4 AH cells and six 25 F Capacitors |
| 2 | Chevrolet Cruze (2200 CC Engine) | 352 AH | 40 | 15 | 88 AH | 5 AH cells and six 50 F Capacitors |
| 3 | Tata 407 (2596 CC Engine) | 400 AH | 40 | 15 | 100 AH | 5 AH cells and six 100 F Capacitors |

In second working example, an ultracapacitor having capacity of 1000 F or more is coupled to a battery, having low current output such as 30 A is used as suggested in U.S. Pat. No. 8,384,360. A power source such as this depends on the quick charging from an alternator of the vehicle. If the alternator connection is disturbed the power source fails even after two attempts of cranking whereas the hybrid pack of the present disclosure under similar conditions survived for more than 30 attempts.

On an accelerated charging discharging tests where one charging to next recharge is considered as a cycle. A conventional battery Exide (DIN88) was able to survive for 652 cycles, similarly Amron (AAM-GO-000-90AH) was able to survive for 660 cycles whereas the hybrid power pack of the present disclosure survived in a first test 6648 cycles, and on a second test 6396 cycles. In addition, the conventional battery packs need at least some amount of maintenance. The hybrid power pack of the present disclosure when tested over 14 months and after the vehicle (Cruze, 2.2 L Engine) was driven for over 22000 Kms gave adequate sustained power for starting, and for the electrical system of the vehicle including the music system and the lights, without any maintenance what so ever during that period, except cleaning (degreasing and dust removal) of the contact terminals.

TECHNICAL ADVANCEMENTS: The technical advantages of the hybrid power pack envisaged by the present disclosure include the following:

provides a high discharge current;

provides sustained DC power;

provides short circuit protection;

provides reverse polarity protection;

provides a smooth start of the vehicle;

provides DC power to a vehicle, a solar system and a telecom station, and limits deep discharge of the plurality of cells.

While considerable emphasis has been placed herein on the particular features of this invention, it will be appreciated that various modifications can be made, and that many changes can be made in the preferred embodiment without departing from the principles of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

The invention claimed is:

1. A hybrid power pack, comprising:
a first storage component generating a first DC output voltage and a first DC output current;
a battery management system coupled to the first storage component via a first unidirectional switch to provide a charging path for the first storage component;
an inout port connected to the battery management system;
a second unidirectional switch coupling the inout port with the first storage component to provide a discharging path for the first storage component;
a second storage component generating a second DC output voltage and a second DC output current, wherein the second storage component is coupled to the inout port via a bidirectional switch to provide a charging path as well as a discharging path for the second storage component;
a controller cooperating with the battery management system, the bidirectional switch and the inout port to provide, to a load connected to the inout port, a sustained DC power selectively from the first storage component, the second storage component or from both storage components simultaneously.

2. The hybrid power pack as claimed in claim 1, wherein the first storage component includes a plurality of cells.

3. The hybrid power pack as claimed in claim 1, wherein the second storage component includes a capacitor bank comprising a plurality of capacitors.

4. The hybrid power pack as claimed in claim 1, wherein the battery management system and the controller are integrated into a first application specific integrated circuit.

5. The hybrid power pack as claimed in claim 2, which includes a cell balancing circuit to equalize at least one of the charge, energy and voltage of said cells.

6. The hybrid power pack as claimed in claim 3, which includes a capacitor balancing circuit to equalize at least one of the charge, energy or voltage of capacitors in said capacitor bank.

7. The hybrid power pack as claimed in claim 1, wherein the first storage component is a plurality of cells, the second storage component is a capacitor bank, the pack includes a cell balancing circuit to equalize the charge, energy or voltage of said cells and a capacitor balancing circuit to equalize the charge, energy or voltage of capacitors in said capacitor bank and the battery management system, the controller, the cell balancing circuit and the capacitor balancing circuit are integrated into a second application specific integrated circuit.

8. The hybrid power pack as claimed in claim 1, which includes a ground terminal and a unipolar transistor being connected to the ground terminal, the inout port and the controller.

9. The hybrid power pack as claimed in claim 1, wherein the bidirectional switch comprises a charging/discharging circuit, a comparator, a zener diode regulator, a switching element and a monitor and control unit for capacitors.

10. The hybrid power pack as claimed in claim 5, wherein the cell balancing circuit includes a cell control circuit and a cell balancing controller.

11. The hybrid pack as claimed in claim 1, which includes an element configured to generate a first AC signal, said element being coupled to the inout port via an amplifier and a rectifier.

12. The hybrid pack as claimed in claim 11, in which said element is configured to generate said first AC signal is a coil wound core such as a coil wound ferrite core.

13. The hybrid pack as claimed in claim 12, which includes a control circuit for the coil wound ferrite core for detecting a voltage/current level of the first AC signal and configured to control gain of the amplifier based on the detected voltage/current level.

14. The hybrid pack as claimed in claim 1, which includes a first AC to DC converter connectable to an AC power source for generating a sustained DC power.

15. The hybrid power pack as claimed in claim 1, which includes a step up DC to DC converter connectable to a DC power source such as a solar cell, fuel cell for generating sustained DC power.

16. The hybrid power pack as claimed in claim 1, which includes an antenna configured to capture radio frequencies, an RF receiver module to generate a second AC signal from said captured radio frequencies, an RF amplifier to amplify said second AC signal and a second AC to DC converter to convert said second AC signal into a DC signal.

17. The hybrid power pack as claimed in claim 1, which includes a cooling fan based on a permanent magnet to generate a third AC signal, a power amplifier to amplify said third AC signal and a power rectifier to convert said third AC signal into a DC signal.

18. The hybrid power pack as claimed in claim 5, wherein the battery management system, the controller and the cell balancing circuit are integrated into a fourth application specific integrated circuit.

19. The hybrid power pack as claimed in claim 1, wherein the controller reads a state of charge (SOC) of the first storage component and SOC of the second storage component and the controller activates a gate terminal of a unipolar transistor to disconnect the first storage component and the second storage component when the SOCs of the first and second storage components are equal to or below a determined end of charge value.

20. A hybrid power pack, comprising:
a first storage component comprising a plurality of cells and generating a first DC output voltage and a first DC output current;
a battery management system coupled to the first storage component via a first unidirectional switch to provide a charging path for the first storage component;
an inout port connected to the battery management system;
a second unidirectional switch coupling the inout port with the first storage component to provide a discharging path for the first storage component;
a second storage component comprising a capacitor bank and generating a second DC output voltage and a second DC output current, wherein the second storage component is coupled to the inout port via a bidirectional switch to provide a charging path as well as a discharging path for the second storage component;
a controller cooperating with the battery management system, the bidirectional switch and the inout port to provide, to a load connected to the inout port, a sustained DC power selectively from the first storage component, the second storage component or from both storage components simultaneously;
a cell balancing circuit to equalize the charge, energy or voltage of said cells; and
a capacitor balancing circuit to equalize the charge, energy or voltage of capacitors in said capacitor bank and the battery management system.

* * * * *